US012739452B2

(12) United States Patent
Weisman et al.

(10) Patent No.: US 12,739,452 B2
(45) **Date of Patent: *Sep. 15, 2026**

(54) MATCHING VIDEO CONTENT TO PODCAST EPISODES

(71) Applicant: Google LLC, Mountain View, CA (US)

(72) Inventors: Omri Weisman, Tel Aviv (IL); Yonit Halperin Worzel, Tel Aviv (IL); Ron Zeitouny, Givatayim (IL); Erez Bixon, Herzliya (IL)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/225,889

(22) Filed: Jun. 2, 2025

(65) Prior Publication Data

US 2025/0291870 A1 Sep. 18, 2025

Related U.S. Application Data

(63) Continuation of application No. 18/656,471, filed on May 6, 2024, now Pat. No. 12,321,413, which is a continuation of application No. 17/493,276, filed on Oct. 4, 2021, now Pat. No. 11,977,599.

(51) Int. Cl.

*G06F 16/90* (2019.01)
*G06F 16/957* (2019.01)
*G06F 16/958* (2019.01)

(52) U.S. Cl.

CPC ........ *G06F 16/958* (2019.01); *G06F 16/9574* (2019.01)

(58) Field of Classification Search

CPC ............................. G06F 16/958; G06F 16/957
See application file for complete search history.

(56) References Cited

U.S. PATENT DOCUMENTS

| | | | |
|---|---|---|---|
| 8,484,017 | B1 | 7/2013 | Sharifi et al. |
| 9,219,900 | B2 | 12/2015 | Billmaier et al. |
| 9,705,945 | B1 | 7/2017 | Lewis et al. |

(Continued)

FOREIGN PATENT DOCUMENTS

| | | | |
|---|---|---|---|
| CN | 101278311 | A | 10/2008 |
| CN | 110418193 | A | 11/2019 |
| JP | 2009510610 | A | 3/2009 |

OTHER PUBLICATIONS

Office Action for Japanese Patent Application No. 2024520610, mailed Jul. 1, 2025, 04 Pages.

(Continued)

*Primary Examiner* — Kristopher Andersen
(74) *Attorney, Agent, or Firm* — Lowenstein Sandler LLP

(57) ABSTRACT

A user input comprising a search term corresponding to a first media type is received. A first media item of the first media type is identified based on the search term. The first media item is associated with a first media item characteristic. A second media item of a second media type is identified. The second media item is associated with a second media item characteristic related to the first media item characteristic. A ranking of at least one of the second media item or the first media item reflects a correspondence between the second media item and the first media item based on a popularity indicator associated with the second media item and a popularity indicator associated with the first media item. The first media item and the second media item are provided to the user device based on the ranking.

20 Claims, 14 Drawing Sheets

(56) References Cited

U.S. PATENT DOCUMENTS

| | | | |
|---|---|---|---|
| 10,229,198 | B2 | 3/2019 | Ong et al. |
| 2007/0078884 | A1 | 4/2007 | Ott, IV et al. |
| 2014/0233905 | A1 | 8/2014 | Billmaier et al. |
| 2015/0039646 | A1 | 2/2015 | Sharifi |
| 2015/0301718 | A1 | 10/2015 | Trollope et al. |
| 2020/0012476 | A1 | 1/2020 | Gatlin et al. |
| 2020/0013380 | A1 | 1/2020 | Kakoyiannis et al. |
| 2020/0285440 | A1 | 9/2020 | Prindle et al. |
| 2022/0050872 | A1 | 2/2022 | Adlersberg et al. |

OTHER PUBLICATIONS

International Search Report and Written Opinion for International Application No. PCT/US2022/045692, mailed Jan. 24, 2023, 13 Pages.

FIG. 3
300
12:30
Podcasts
FOR YOU | NEWS | CULTURE | EDUCATION
Trending Podcasts
SEE ALL
PODCAST A
302
PODCAST B
Podcast A
by PA productions
Podcast B
by BP productions
Inspirational Talks
SEE ALL
PODCAST TALK C
4:47
PODCAST TALK D
4:48
Podcast C
Host John Doe
Podcast D
Jane D. Doe
Talk Shows
SEE ALL
PODCAST
PODCAST
HOME
EXPLORE
SUB.

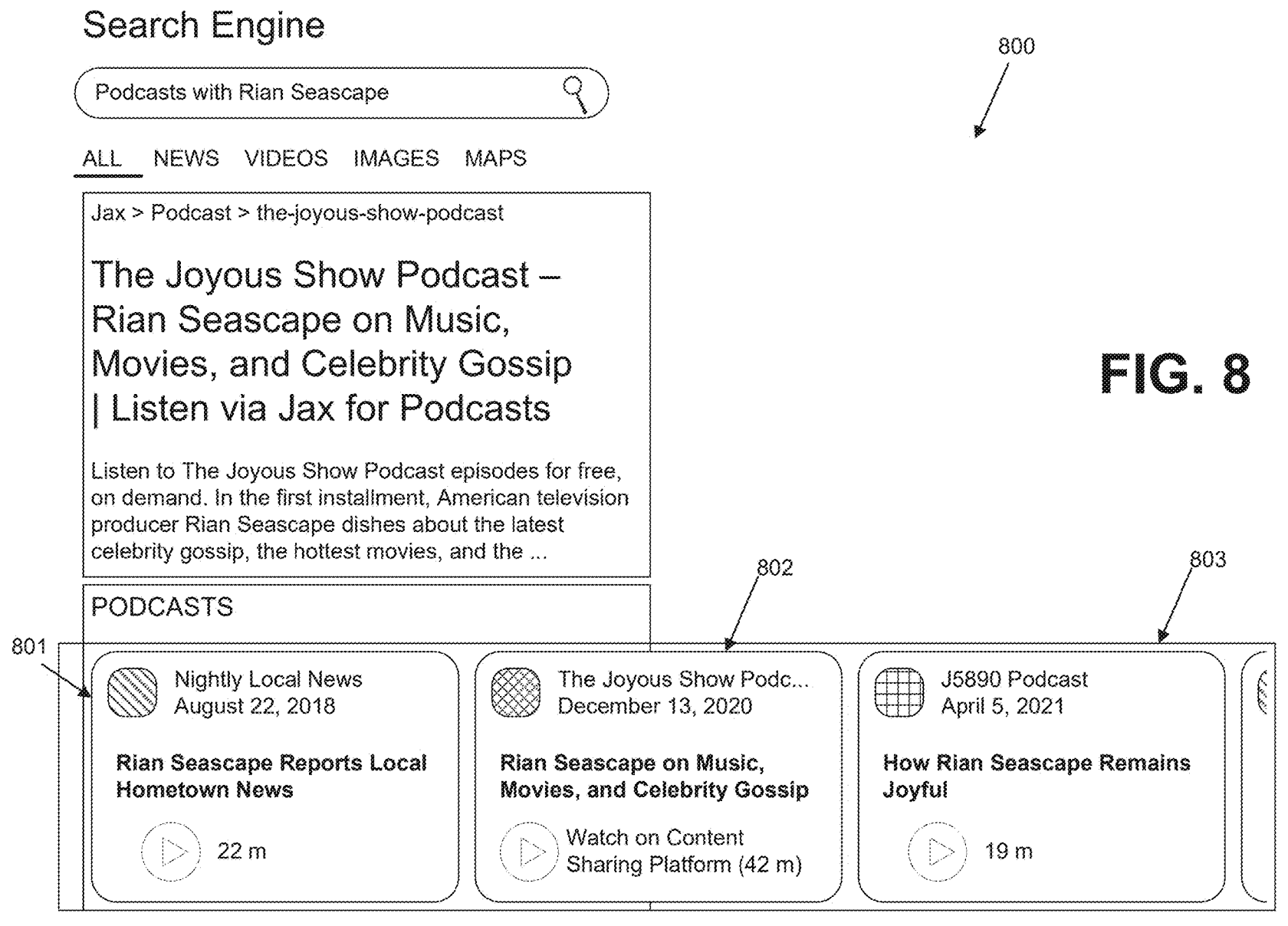

800

Search Engine

Podcasts with Rian Seascape

ALL NEWS VIDEOS IMAGES MAPS

Jax > Podcast > the-joyous-show-podcast

The Joyous Show Podcast – Rian Seascape on Music, Movies, and Celebrity Gossip | Listen via Jax for Podcasts Listen to The Joyous Show Podcast episodes for free, on demand. In the first installment, American television producer Rian Seascape dishes about the latest celebrity gossip, the hottest movies, and the ...

PODCASTS

801

Nightly Local News
August 22, 2018
Rian Seascape Reports Local Hometown News
22 m

802

The Joyous Show Podc...
December 13, 2020
Rian Seascape on Music, Movies, and Celebrity Gossip
Watch on Content Sharing Platform (42 m)

803

J5890 Podcast
April 5, 2021
How Rian Seascape Remains Joyful
19 m

FIG. 8

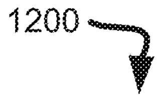

Access a data store comprising one or more podcast episode identifiers and one or more video content item identifiers, wherein a podcast episode identifier of the one or more podcast episode identifiers is associated with one or more podcast episode attributes, and wherein a video content item identifier of the one or more video content item identifiers is associated with one or more video content item attributes. 1210

Determine, for a matching podcast episode identifier of the one or more podcast episode identifiers, based on the one or more podcast episode attributes associated with the matching podcast episode identifier, a matching video content item identifier. 1220

Cause a ranking of at least one of the matching video content item identifier or the matching podcast episode identifier to be adjusted to reflect a correspondence between the matching video content item identifier and the matching podcast episode identifier. 1230

Provide, to a user device, information associated with the matching podcast episode identifier and with the video content item identifier. 1240

FIG. 12

MATCHING VIDEO CONTENT TO PODCAST EPISODES

CROSS-REFERENCE TO RELATED APPLICATIONS

The present application is a continuation of, and claims priority to, application Ser. No. 18/656,471, filed May 6, 2024, entitled entitled "MATCHING VIDEO CONTENT TO PODCAST EPISODES," which is a continuation of, and claims priority to, application Ser. No. 17/493,276, filed Oct. 4, 2021, now U.S. Pat. No. 11,977,599 B2, entitled "MATCHING VIDEO CONTENT TO PODCAST EPISODES," which is incorporated by reference herein.

TECHNICAL FIELD

Aspects and implementations of the present disclosure relate to matching video content to podcast episodes.

BACKGROUND

A variety of platforms enable users to listen to audio content such as podcast episodes. For example, users can search for and find audio content using a search engine or through a content sharing platform. Additionally, podcast publishers can use a podcast manager platform to track analytical information about the podcasts. Analytical information can include number of times a podcast episode has started, an average length of time that users have listened to a particular podcast episode, and demographics about the podcast listeners.

SUMMARY

The following is a simplified summary of the disclosure in order to provide a basic understanding of some aspects of the disclosure. This summary is not an extensive overview of the disclosure. It is intended neither to identify key or critical elements of the disclosure, nor to delineate any scope of the particular embodiments of the disclosure or any scope of the claims. Its sole purpose is to present some concepts of the disclosure in a simplified form as a prelude to the more detailed description that is presented later.

In some implementations, a system and method are disclosed for matching video content item to a podcast episode to enhance a content sharing platform. In an implementation, a data store comprising one or more podcast episode identifiers and one or more video content item identifiers is accessed. A podcast episode identifier of the one or more podcast episode identifiers can be associated with one or more podcast episode attributes, and a video content item identifier of the one or more video content item identifiers can be associated with one or more video content item attributes is accessed. For a matching podcast episode identifier of the one or more podcast episode identifiers, a matching video content item identifier is determined based on the one or more podcast episode attributes associated with the matching podcast episode identifier. A ranking of at least one of the matching video content item identifier or the matching podcast episode identifier is caused to be adjusted to reflect a correspondence between the matching video content item identifier and the matching podcast episode identifier. Information associated with the matching podcast episode identifier is provided to a first user device.

In some implementations, another system and method are disclosed for matching video content items to podcast episodes to enhance a search engine platform. In an implementation, a data store comprising one or more podcast episode identifiers and one or more video content item identifiers is accessed. A podcast episode identifier of the one or more podcast episode identifiers can be associated with one or more podcast episode attributes, and a video content item identifier of the one or more video content item identifiers can be associated with one or more video content item attributes. For a matching podcast episode identifier of the one or more podcast episode identifiers, a matching video content item identifier is determined based on the one or more podcast episode attributes associated with the matching podcast episode identifier. A ranking of at least one of the matching video content item identifier or the matching podcast episode identifier is caused to be adjusted to reflect a correspondence between the matching video content item identifier and the matching podcast episode identifier. Information associated with the matching podcast episode identifier and with the matching video content item identifier is provided to a user device.

In some implementations, another system and method are disclosed for matching video content items to podcast episodes to enhance a podcast manager platform. In an implementation, a request for podcast analytical information for a podcast is received. The podcast can be associated with one or more podcast episodes. An identification of a source comprising one or more video content items is received. Additionally, one or more podcast episode attributes are identified for the one or more podcast episodes, and one or more video content item attributes are identified for the one or more video content items. Based on the one or more podcast episode attributes and the one or more video content item attributes, a matching video content item that matches a matching podcast episode of the one or more podcast episodes is determined. Analytical information associated with the matching video content item is determined. A response to the request is provided. The response includes the analytical information associated with the matching video content item and the podcast analytical information.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

FIG. 8 illustrates an example GUI of a search engine platform optimized according to aspects of the present disclosure.

FIG. 12 depicts a flow diagram of a method for enhancing a search engine platform by matching video content item to podcast episodes, in accordance with an implementation of the disclosure.

Figure 1:
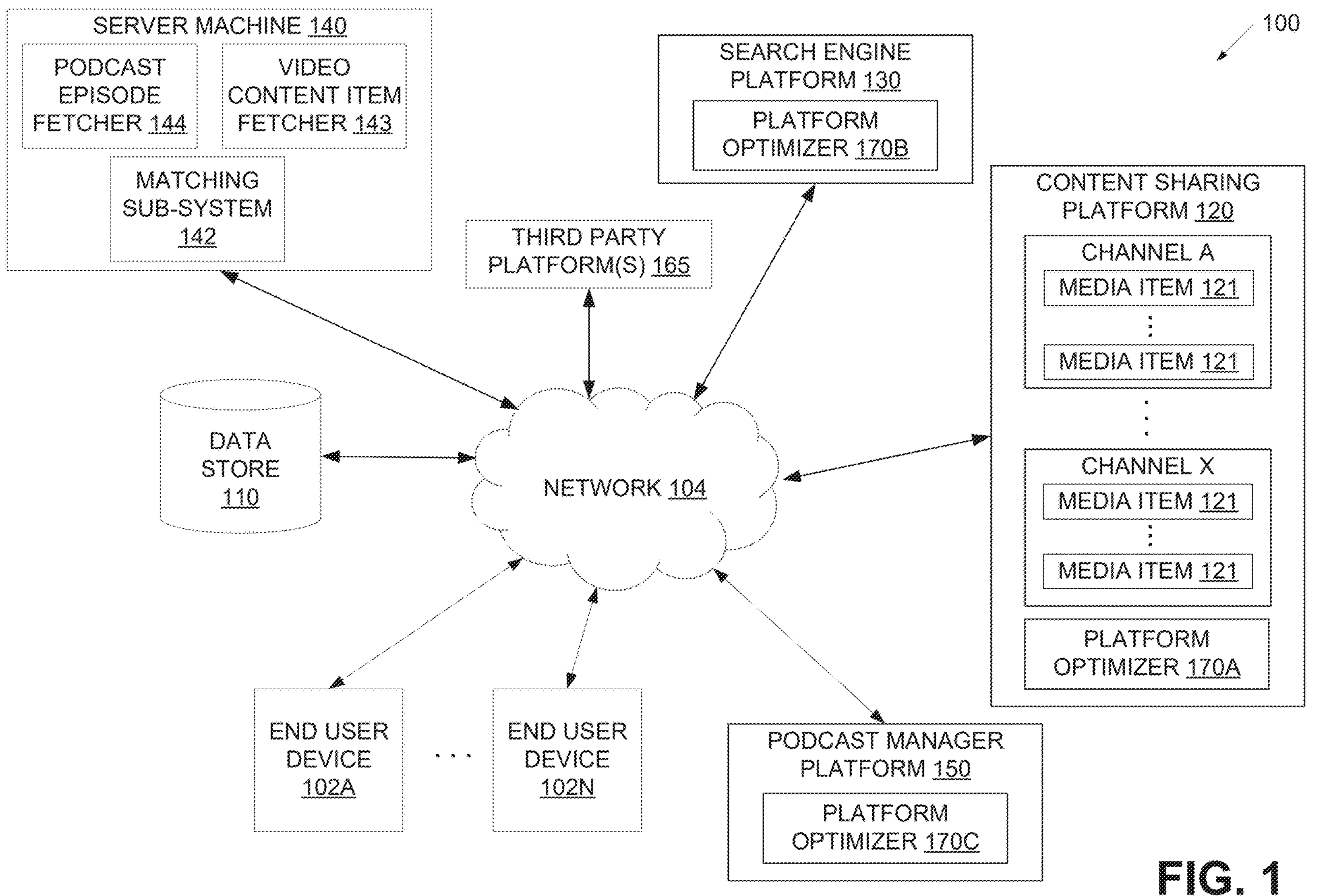
FIG. 1 illustrates an example system architecture, in accordance with an implementation of the disclosure.

These drawings may be better understood when observed in connection with the following detailed description.

DETAILED DESCRIPTION

Aspects of the present disclosure relate to matching video content to podcast episodes. Podcast creators and/or publishers can publish podcast episodes both in audio and video formats. For example, a podcast publisher may publish an episode as an audio file through a podcast publishing service, and may publish a video of the same episode through a video hosting service. The video may include a video recording of the podcast hosts recording the episode, and/or may include slides or images related to the episode content.

In many instances, the content of the video differs from the content of the audio format of the podcast episode. For example, the video of the podcast episode may include a visual intro and outro, while the intro/outro for the audio format of the podcast episode may be optimized for listening (e.g., the outro for the video format may include credits in a printed format, while the outro of the audio format may include the credits expressed orally). In some instances, the breaks or recaps included in the audio and video formats may differ. For example, an audio version of the podcast episode may include breaks every set number of minutes (e.g., every 15 minutes) and may include a recap following the break, to accommodate the publisher's platform (e.g., a radio station). The video format of the podcast episode, however, may exclude the breaks and recaps, or may include them at different time intervals. Furthermore, the video and audio formats may not be published on the same date. For example, a podcast episode may first be published in audio format, and may only be published as a video if the audio version reaches a certain number of plays.

Existing content sharing platforms, search engines, and/or podcast managers all operate separately and if users need to find matching podcast episodes on these different platforms, they have to switch between multiple applications. This switching takes significant time and computing resources. Aspects and implementations of the present disclosure address the above-noted and other deficiencies or problems by providing technology that matches video content to podcast episodes across multiple platforms/systems (e.g., content sharing platforms, search engines, and/or podcast managers). In additions, aspects and implementations of the present disclosure provides tools that can combine performance metrics, analytical data, and information across the multiple platforms/systems and can cover both audio episode formats and video episode formats.

In some implementations, in order to match a video content item to a podcast episode (and vice versa), a matching system operating in accordance with aspects of the present disclosure may identify attributes associated with video content items as well as attributes associated with podcast episodes. The attributes can include a transcript of the audio of the video content item and/or of the podcast episode, a duration of the video content item and/or of the podcast episode, the title, the description, and/or the publication date. Additional attributes not listed here may be identified. The matching system may compare the attributes to generate a matching score for every episode-video pair. The episode-video pair with the highest matching score can be determined to match.

Based on the matching, a platform optimizing system operating in accordance with aspects of the present disclosure may enhance the podcast publisher's experience by providing a comprehensive analytical information that includes data from both the audio and video formats of the episode. The platform optimizing system may also enhance a search engine platform user's and/or a content sharing platform user's experience by providing search results that includes both audio and video formats of the episode, including optimized versions for each format. Furthermore, the rankings used to generate search results on either a search engine platform or a content sharing platform may be enhanced based on the matching of the content items with the podcast episodes.

More specifically, by matching the video format of a podcast episode with the audio format of the podcast episode, a podcast analytics provider can provide analytical information associated with both the video and audio formats, rather than simply for the audio format. For example, a podcast analytics provider can display combined data about the overall number of plays for an episode across both audio and video, thus providing a more complete picture to the podcast publishers. Additionally, by matching the video format of a podcast episode with the audio format of the podcast episode, a search engine can enhance the ranking signals by combining the performance numbers of each format, such as number of plays. Additionally, the search engine ranking signals are enhanced by combining the information associated with both the audio and video format. For example, a video of podcast episode may not include host information, while the audio format of the same podcast episode may include host information. By determining that the two match, the combined information can adjust the rankings of both formats. The search engine can further be enhanced by presenting search results that include combined audio and video items, rather than displaying separate experiences for audio formats and for video formats.

Furthermore, content sharing platforms can benefit from matching video formats of podcast episodes to the audio format. Similar to the search engine, the content sharing platform can adjust the rankings of both formats by combining the performance numbers of the video format with the performance numbers of the audio format. The rankings can also be adjusted by combining information from both formats (e.g., host information). Additionally, the user experience of the content sharing platform can be enhanced by offering a "listen-only" experience to viewers watching a video content item that is matched to a podcast episode. An optimized listen-only experience can be provided when a content sharing platform displays a video that is matched to a podcast episode. The listen-only experience can include, but is not limited to, information about the matched podcast and/or the hosts, previous/next episode controls, automatically play another listen-only video when the video finishes, the ability to subscribe to the podcast, and the ability to donate/contribute to the podcast publisher. Additionally, advertisements presented during the video through the content sharing platform can be enhanced when the video is matched to a podcast episode. Rather than embedding general-purpose video advertisements, the content sharing platform can provide advertisements that are designed to be listened to.

Aspects of the present disclosure provide a number of technical advantages including, for example, a mechanism that can match podcast episodes across different content sharing platforms, search engines, and/or podcast managers, thereby creating deeper integration between these platforms/systems and reducing time and computing resources that would be otherwise consumed by repeated manual switching (e.g., switching between platforms/systems) applications or interfaces) done by a user. Another technical advantage is improved and extended functionality of search engine platforms, content sharing platforms, and podcast manager platforms. In particular, aspects of the present disclosure combine ranking signals associated with matched podcast episodes and video content items to provide improved search results. For example, performance numbers for the podcast episode can be combined with the performance numbers for the matched video content item, thus providing more accurate ranking signals for both the podcast episode and video content item. By providing more accurate ranking signals, the content sharing platform and/or the search engine platform can provide more accurate results to the user, thus avoiding wasting computer resources on providing less accurate search results. Additionally, the content sharing platform experience can be optimized to provide better controls related to a listen-only experience when a user is viewing a video that is matched to a podcast episode, thus improving the operation of the content sharing platform.

Various aspects of the above referenced methods and systems are described in detail herein below by way of examples, rather than by way of limitation.

FIG. 1 illustrates an example system architecture 100, in accordance with an implementation of the present disclosure. The system architecture 100 (also referred to as "system" herein) includes end user devices 102A-N, a data store 110, a content sharing platform 120, a search engine platform 130, a podcast manager platform 150, a server machine 140, and a third party platform 165, each connected to a network 104.

In implementations, network 104 may include a public network (e.g., the Internet), a private network (e.g., a local area network (LAN) or a wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

The end user devices 102A-N may each include computing devices such as personal computers (PCs), laptops, mobile phones, smart phones, tablet computers, netbook computers, network-connected televisions, etc. In some implementations, end user devices 102A-N may also be referred to as "user devices" or "client devices." Each end user device may include a content viewer. In some implementations, a content viewer may be an application that provides a user interface (UI) for users to view or upload content, such as images, video items, podcast episodes, web pages, documents, etc. For example, the content viewer may be a web browser that can access, retrieve, present, and/or navigate content (e.g., web pages such as Hyper Text Markup Language (HTML) pages, digital media items, etc.) served by a web server. The content viewer may render, display, and/or present the content to a user. The content viewer may also include an embedded media player (e.g., a Flash® player or an HTML5 player) that is embedded in a web page (e.g., a web page that may provide information about a product sold by an online merchant). In another example, the content viewer may be a standalone application (e.g., a mobile application or app) that allows users to view digital media items (e.g., digital video items, digital podcast episodes, digital images, electronic books, etc.).

According to aspects of the disclosure, the content viewer may be a content sharing platform application for users to record, edit, and/or upload content for sharing on content sharing platform 120. As such, the content viewers may be provided to the end user devices 102A-N by content sharing platform 120. For example, the content viewers may be embedded media players that are embedded in web pages provided by the content sharing platform 120. The content viewer may be a search platform application for users to search for content using search engine platform 130. Additionally or alternatively, the content viewer may be a podcast manager application that enables users to manage podcasts on a podcast manager platform 150.

A media item 121 may be consumed via the Internet or via a mobile device application, such as a content viewer of end user device 102A-N. A requested media item 121 may be requested for presentation to the user by the user of the content sharing platform 120. As used herein, "media," "media item," "online media item," "digital media," "digital media item," "content," and "content item" can include an electronic file that can be executed or loaded using software, firmware, or hardware configured to present the digital media item to an entity. In one implementation, the content sharing platform 120 may store the media items 121 using the data store 110. In another implementation, the content sharing platform 120 may store media items 121 or fingerprints as electronic files in one or more formats using data store 110. The media items 121 may be provided to the user, wherein the provision of the media item 121 may include allowing access to the media item 121, transmitting the media item 121, and/or presenting or permitting presentation of the media item 121.

In some implementations, a media item 121 may be a video item. A video item is a set of sequential video frames (e.g., image frames) representing a scene in motion. For example, a series of sequential video frames may be captured continuously or later reconstructed to produce animation. Video items may be provided in various formats including, but not limited to, analog, digital, two-dimensional and three-dimensional video. Further, video items may include movies, video clips or any set of animated images to be displayed in sequence. In addition, a video item may be stored as a video file that includes a video component and an audio component. The video component may refer to video data in a video coding format or image coding format (e.g., H.264 (MPEG-4 AVC), H.264 MPEG-4 Part 2, Graphic Interchange Format (GIF), WebP, etc.). The audio component may refer to audio data in an audio coding format (e.g., advanced audio coding (AAC), MP3, etc.). It may be noted GIF may be saved as an image file (e.g., .gif file) or saved as a series of images into an animated GIF (e.g., GIF89a format). It may be noted that H.264 may be a video coding format that is block-oriented motion-compensation-based video compression standard for recording, compression, or distribution of video content, for example.

In some implementations, a media item 121 may be an audio file, such as a podcast episode. A media item 121 that is a video item may be a video version of a podcast episode. For example, the video version of a podcast episode can be a video of the hosts creating the podcast episode, or it can be an image or a series of images related to the topic of the podcast episode combined with the audio of the podcast episode.

In some implementations, data store 110 is a persistent storage that is capable of storing media items 121 as well as data structures to tag, organize, and index the media items 121. Data store 110 may be hosted by one or more storage devices, such as main memory, magnetic or optical storage based disks, tapes or hard drives, NAS, SAN, and so forth. In some implementations, data store 110 may be a network-attached file server, while in other embodiments data store 110 may be some other type of persistent storage such as an object-oriented database, a relational database, and so forth, that may be hosted by content sharing platform 120 or one or more different machines coupled to the server content sharing platform 120 via network 104.

In one implementation, content sharing platform 120, search engine platform 130, podcast manager platform 150, or server machine 140 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items 121 and/or provide the media items 121 to the user. For example, content sharing platform 120 may allow a user to consume, upload, search for, approve of ("like"), disapprove of ("dislike"), or comment on media items 121. Content sharing platform 120 may also include a website (e.g., a webpage) or application back-end software that may be used to provide a user with access to the media items 121. As another example, search engine platform 130 may allow a user to perform an Internet search, which can include searching media items 121. Search engine platform 130 may include a website (e.g., a webpage) or application back-end software that may be used to provide a user with access to the Internet, including media items 121. As another example, podcast manager platform 150 may provide podcast analytical information to a user. For example, a user may be a podcast publisher. The podcast manager platform 150 may enable the podcast publisher to view a list of published podcasts and episodes, and can include performance data (e.g., number of plays, dates of plays, average lengths of plays, etc.), as well as demographics information of the listeners, for each podcast episode.

In some implementations, the content sharing platform 120, search engine platform 130, and/or podcast manager platform 150 may each be combined into a single platform. In some implementations, server machine 140 or any of its components (e.g., podcast episode fetcher 144, video content item fetcher 143, and/or matching sub-system 142) may be combined with the platforms 120, 130, 150. Each platform 120, 130, 150 may include a platform optimizer 170A-C. Platform optimizer 170A-C may use the results from the matching sub-system 142 to optimize the platform operations.

In implementations of the disclosure, a "user" may be represented as a single individual. However, other implementations of the disclosure encompass a "user" being an entity controlled by a set of users and/or an automated source. For example, a set of individual users federated as a community in a social network may be considered a "user". In another example, an automated consumer may be an automated ingestion pipeline, such as a topic channel, of the content sharing platform 120.

Content sharing platform 120 may include multiple channels (e.g., channels A through X). A channel can include one or more media items 121 available from a common source or media items 121 having a common topic, theme, or substance. Media items 121 can be digital content chosen by a user, digital content made available by a user, digital content uploaded by a user, digital content chosen by a content provider, digital content chosen by a broadcaster, etc. A channel can be associated with an owner, who is a user that can perform actions on the channel. Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel. Users, other than the owner of the channel, can subscribe to one or more channels in which they are interested. The concept of "subscribing" may also be referred to as "liking", "following", "friending", and so on.

Third party platform(s) 165 can be used to provide video and/or audio advertisements. Alternatively, third party platform(s) 165 can provide other services. For example, third party platform(s) 165 may be a video streaming service provider that produces a media streaming service via a communication application for users to play videos, TV shows, video clips, audio, audio clips, and movies, on end user devices 102A-N via the third party platform(s) 165. In some implementations, a content provider may upload or otherwise provide (e.g., via third party platform 165) a media item 121 to content sharing platform 120 for presentation to one or more users.

In some implementations, server machine 140 may include a podcast episode fetcher 144, a video content item fetcher 143, and a matching sub-system 142. In some implementations, the podcast episode fetcher 144 may identify podcast episodes that have been uploaded to the web. For example, the podcast episode fetcher 144 can have a web crawler that crawls across the Internet in a methodical and automated manner to locate podcast episodes. In some implementations, the podcast episode fetcher 144 can identify podcast episodes that have been uploaded via the content sharing platform 120 and/or the podcast manager platform 150. Upon locating and/or identifying a podcast episode, the podcast episode fetcher 144 can store a podcast episode identifier in data store 110. The podcast episode identifier can be the podcast episode's URL, and/or can be an identifier that links to the podcast episode's URL. In some implementations, the podcast episode fetcher 144 can further extract certain metadata from the identified podcast episode and store the extracted metadata as attributes in data store 110.

The video content item fetcher 143 can function in a similar manner. That is, the video content item fetcher 143 can have a web crawler that crawls the Internet in a methodical and automated manner to local video content items. In some implementations, the video content item fetcher 143 can identify video content items that have been uploaded via the content sharing platform 120 and/or the podcast manager platform 150. Upon locating and/or identifying a video content item, the video content item fetcher 143 can store a video content item identifier in data store 110. The video content item identifier can be the video content item's URL, and/or can be an identifier that links to the video content item's URL. In some implementations, the video content item fetcher 143 can extract metadata from the identified video content item and store the extracted metadata as attributes in data store 110.

The matching sub-system 142 can identify matching video content items and podcast episodes. In some implementations, the matching sub-system 142 can use the extracted metadata and/or other information about the podcast episode identifiers and video content item identifiers stored in data store 110 to match podcast episodes to video content items. The matching sub-system 142 can store matched podcast episode identifiers and matched video content item identifiers in data store 110. The matching sub-system 142 and data store 110 are further described with respect to FIG. 2.

In some implementations, the matching sub-system 142 is a machine learning module trained to assign a matching score to pairs of podcast episode identifiers and video content item identifiers based on the attributes of each media item. In some implementations, the machine learning model may be trained using a labeled set of input training data. The set of input training data can include a subset of podcast episode identifiers associated with episode attributes (e.g., audio, transcript, duration, publication date, title, description, etc.) paired with matching video content item identifiers associated with video content item attributes (e.g., audio, transcript, duration, publication date, title, description, etc.). The set of input training data can also include a subset of podcast episode identifiers associated with episode attributes paired with non-matching video content item identifiers associated with video content item attributes. The supervised machine learning model can be trained, using the input training data to train, to provide a high score when a video content item matches a podcast episode, and to provide a low score when a video content item does not match a podcast episode.

In some implementations, platform optimizer 170A-C can use the results of the matching system 142 to optimize a platform. In some implementations, the platform optimizer 170A can be used to optimize the content sharing platform 120, and/or to enhance a user experience of content sharing platform 120. In some implementations, to optimize the content sharing platform 120, the platform optimizer 170A can cause the ranking of the matched video content item identifier and/or the matched podcast episode identifier to be adjusted to reflect the correspondence between the matched video content item identifier and the matched podcast episode identifier. That is, the content sharing platform 120 can rank video content items and/or podcast episodes based on certain metrics. These metrics can include, for example, popularity indicators, such as a number of recommendations made of the video content item and/or podcast episode, a number of likes of the video content item and/or podcast episode, a number of views of the video content item and/or podcast episode, a number of shares of the video content item and/or the podcast episode. In some implementations, the video content item and/or podcast episode identifier can further be ranked based on the subject matter of the item.

Once a video content item identifier and a podcast episode identifier have been matched by the matching sub-system 142, the platform optimizer 170A can combine the rankings of the matched video content item identifier and the matched podcast episode identifier, e.g., by combining the popularity indicators of each item. The content sharing platform 120 can use these combined rankings to provide more accurate representation of the podcast episode and/or video content item within the content sharing platform 120. The platform optimizer 170A can also cause the content sharing platform 120 to provide information associated with both the matched podcast episode identifier and the matched video content item identifier to users. For example, a user may use the content sharing platform 120 to search for a video about a certain topic. The content sharing platform 120 can identify one or more video content items relating to the certain topic using the combined rankings generated by platform optimizer 170A. For example, a video content item that may not have ranked highly based on its popularity indicators alone may now rank higher based on its matching podcast episode's popularity indicators.

Furthermore, the content sharing platform 120 can provide to the user, in response to the user's search request, both video content items and matching podcast episodes related to the searched topic. In providing matching podcast episodes, the content sharing platform 120 can include audio-specific features and/or podcast-specific information. For example, the audio-specific features can include a "listen-only" option. One example of a "listen-only" feature can include optimized advertisements or promotional items that are better suited to be listened to, as opposed to advertisements or promotional items that are better suited for watching. For example, a user may be using the content sharing platform 120 to watch a video content item that has a matching podcast episode. The content sharing platform 120 may present the video content item with a "listen-only" option, and/or may present the video content item optimized for a listening experience. The promotional items presented during the video content item may be optimized for a listening experience. As another example, the podcast-specific information can include a "next/previous episode" feature, and/or host information. FIGS. 3-7 illustrate an example content sharing platform 120 graphical user interface enhanced by the platform optimizer 170A.

In some implementations, the platform optimizer 170B can be used to optimize the search engine platform 130, and/or to enhance a user experience of search engine platform 130. In some implementations, similar to how platform optimizer 170A optimizes the content sharing platform 120, platform optimizer 170B can optimize the search engine platform 130 by causing the ranking of the matched video content items and/or matched podcast episodes to be adjusted to reflect the correlation between the two. The search engine platform 130 can rank the podcast episode identifiers and/or the video content item identifiers based on certain metrics, including number of plays. The platform optimizer 170B can combine the number of plays of the matched video content item identifier with the number of plays of the matched podcast episode identifier. The number of plays can be the number of times the video content item associated with the video content identifier was started to play on the content sharing platform, on the search engine platform, and/or on another platform. The number of plays can be the number of times the podcast episode associated with the podcast episode identifier was started to play on the content sharing platform, on the search engine platform, on podcast manager platform, and/or on another platform.

The search engine platform 130 can use the combined number of plays to rank both the matched video content item and the matched podcast episode when determining whether to return either or both in response to a search. For example, a user can use the search engine platform 130 to search the internet for a particular subject matter. The search engine platform 130 can determine that the results include a particular video content item. The search engine platform 130, via the platform optimizer 170B, can determine that the particular video content item has a matching podcast episode (as determined by matching sub-system 142). The platform optimizer 170B can adjust the ranking of the video content item based on the combined metrics associated with both the video content item and the matched podcast episode. The metrics can include, for example, a number of plays and/or popularity metrics.

The platform optimizer 170B can also be used to enhance the user experience of search engine platform 130. In some implementations, when search results include a video content item that has a matched podcast episode (or vice versa, a podcast episode that has a matched video content item), the search engine platform 130 can display both the video content items and the podcast episodes. An example graphical user interface of the search engine platform 130 enhanced by platform optimizer 170B is illustrated in FIG. 8.

In some implementations, the platform optimizer 170C can be used to optimize the podcast manager platform 150, and/or to enhance a user experience of podcast manager platform 150. A podcast manager platform 150 can provide, e.g. to podcast publishers, podcast analytical information, including, for example, a number of times a podcast episode was played, the number of plays in the last 30 days, and an average duration of the plays. In some implementations, to optimize the podcast manager platform 150, the platform optimizer 170C can identify analytical information associated with both the matched podcast episode identifier as well as the matched video content item identifier. In some implementations, the podcast manager platform 150 can use an API to fetch analytical information associated with the matched video content item identifier from the content sharing platform 120, for example.

Figure 9:
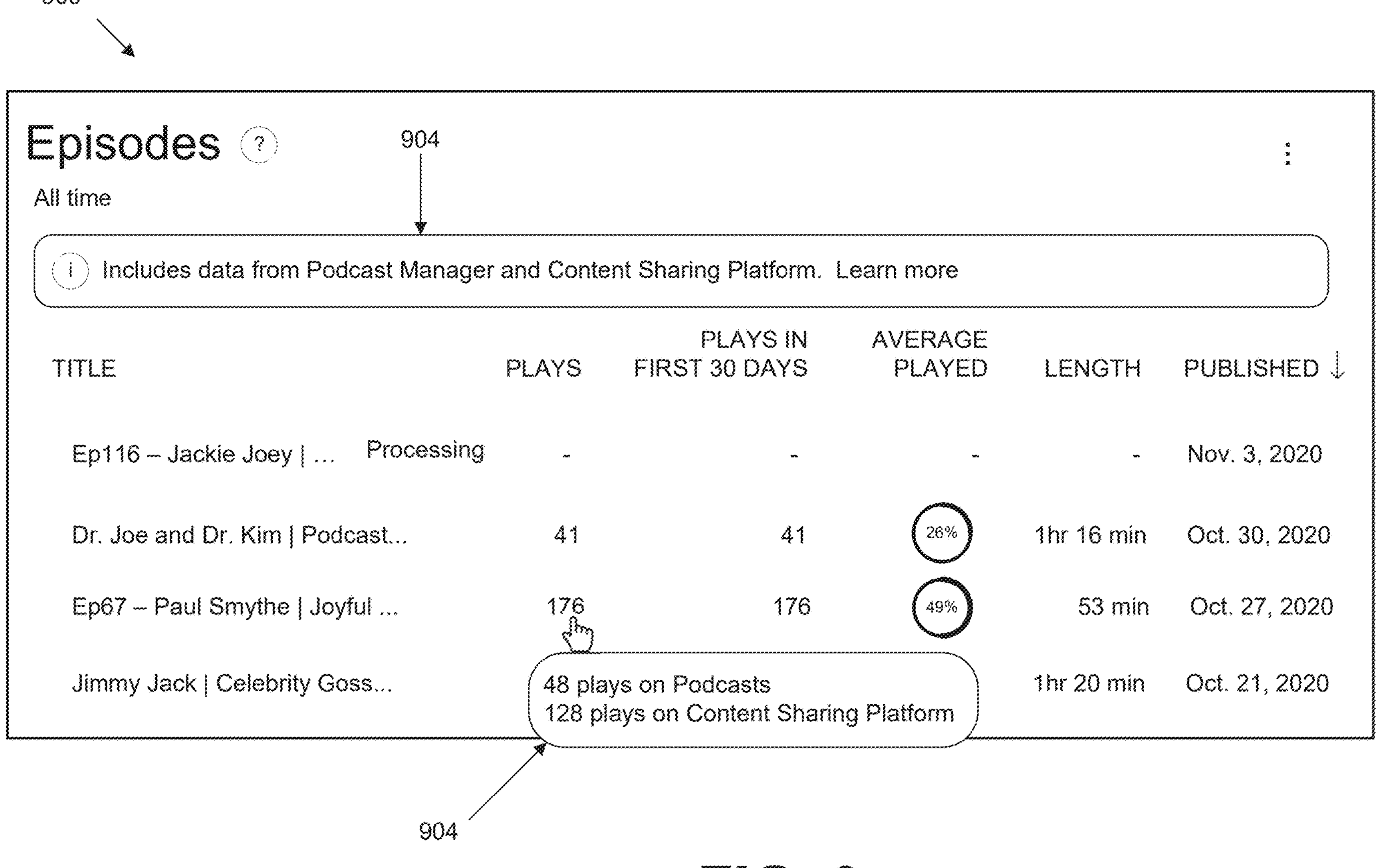
FIGS. 9 and 10 illustrate an example GUI of a podcast manager platform optimized according to aspects of the present disclosure.
Figure 10:
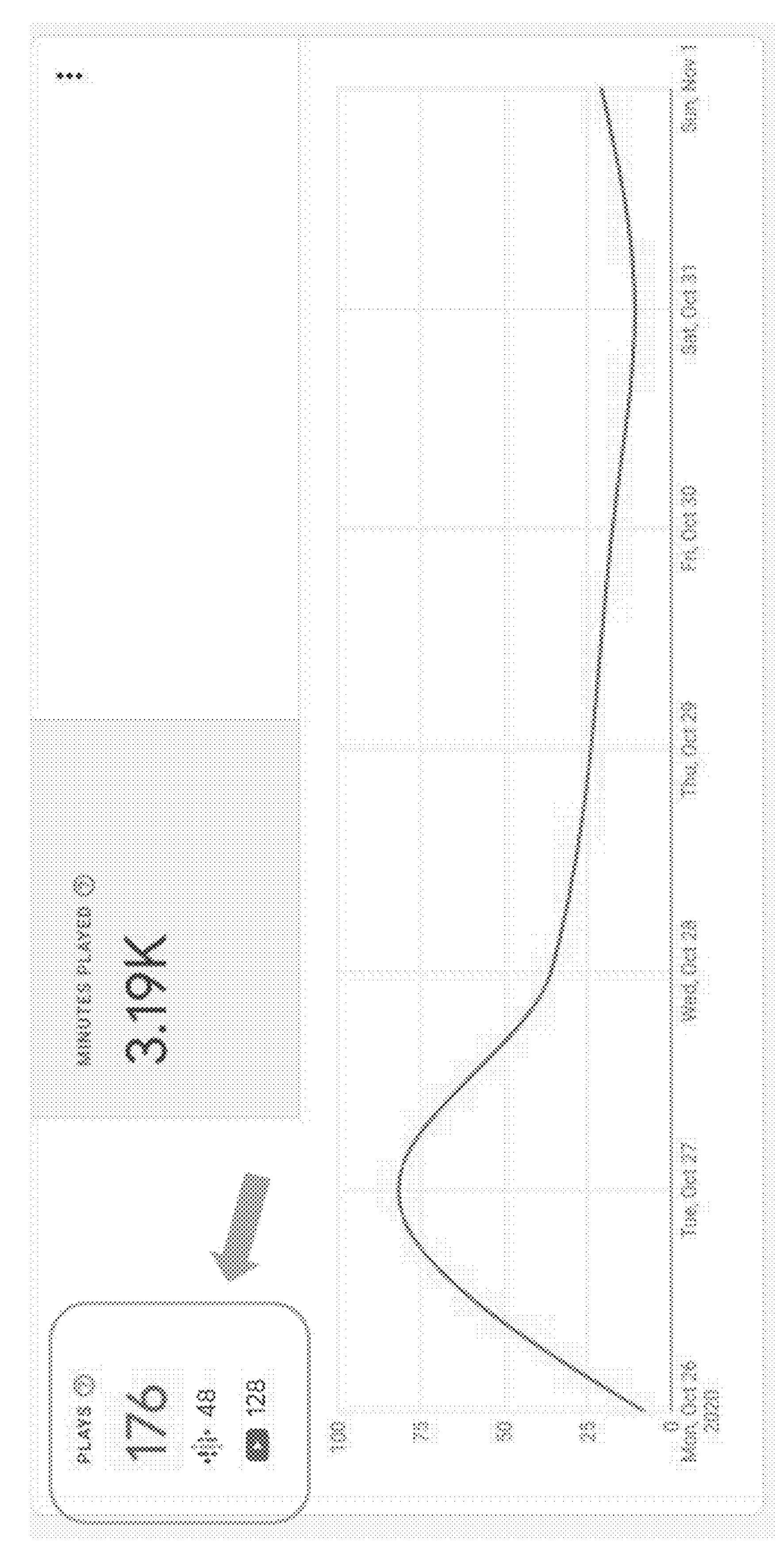

In some implementations, a user (e.g., a podcast publisher) of a podcast manager platform 150 can use podcast manager platform 150 to request analytical information for a podcast. The user can identify one or more channels A-X of content sharing platform 120 that are associated with the user's podcast episodes. The podcast manager platform 150 can identify the podcast episode identifiers associated with the user, as well as can identify the video content item identifiers associated with the identified channel(s). The platform optimizer 170C can match the identified video content item identifiers to the identified podcast episode identifiers using the matching sub-system 142. The platform optimizer 170C can then determine analytical information associated with the matched podcast episode identifier and the matched video content item identifier, and provide the analytical information to the user. Examples of a graphical user interface of a podcast manager platform 150 enhanced by platform optimizer 170C are illustrated in FIGS. 9-10.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Figure 2:
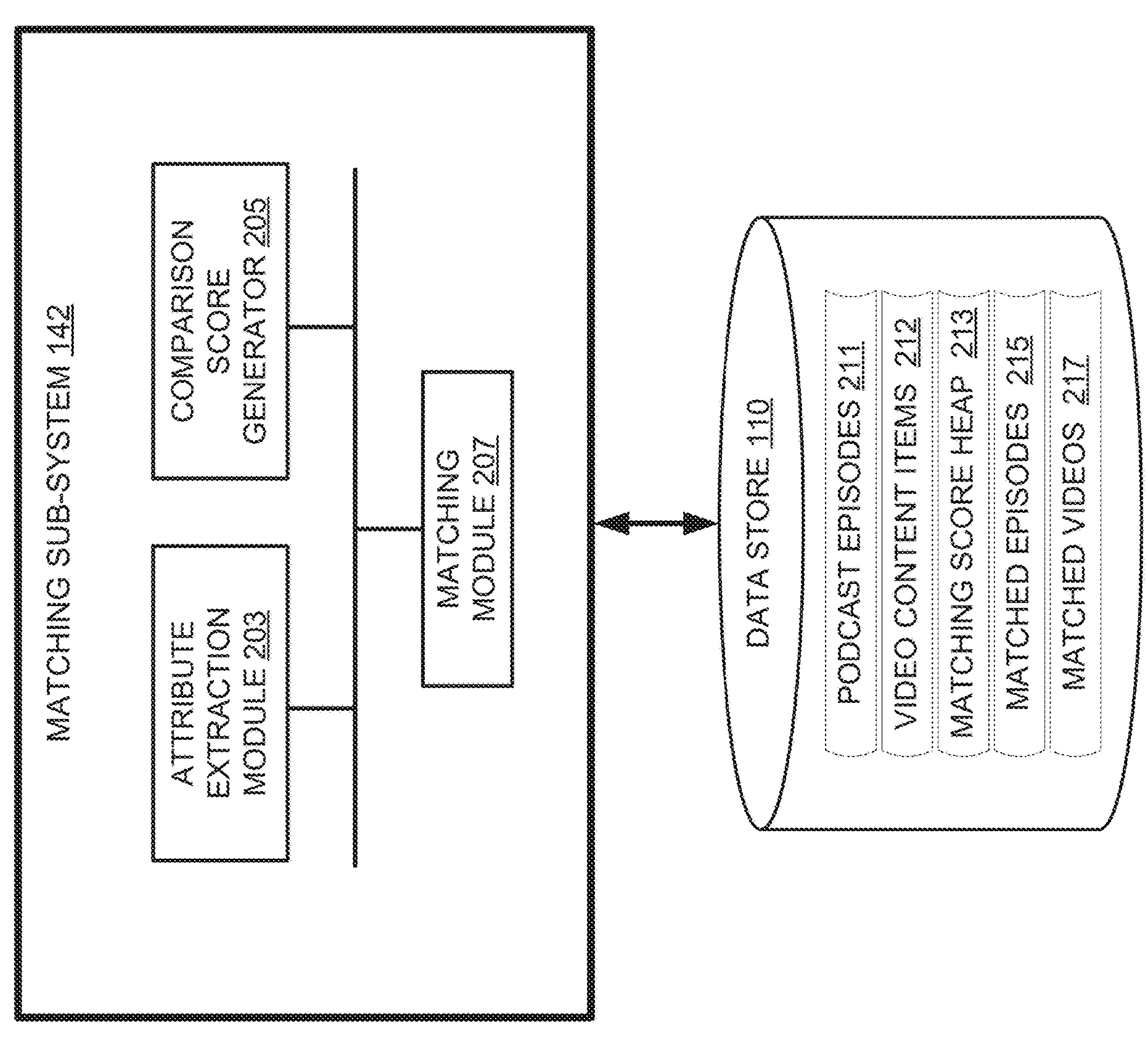
FIG. 2 depicts an example of a matching sub-system, in accordance with an implementation of the disclosure.

FIG. 2 illustrates a matching sub-system, in accordance with an implementation of the disclosure. The matching sub-system 142 can include an attribute extraction module 203, a comparison score generator 205, and a matching module 207.

The data store 110 can store podcast episodes 211, video content items 212, a matching score heap 213, a set of matched podcast episodes 214, and a set of matched video content items 215. The podcast episodes 211 can include a list of identified podcast episodes, identified by the podcast episode fetcher 144 of FIG. 1. In some implementations, podcast episodes 211 stores a list of podcast identifiers that reference podcast episodes stored in another data store (not pictured). For example, podcast episodes 211 can be an index of podcast episodes. Similarly, the video content items 212 can include a list of identified video content items, identified by video content item fetcher 143 of FIG. 1. In some implementations, video content items 212 stores a list of video content items that reference video content items stored in another data store (not pictured). For example, video content items 212 can be an index of video content items.

The attribute extraction module 203 can extract attributes from podcast episodes and/or video content items. Attributes can include, and are not limited to, a transcript of the audio, the audio content, a title, a description, a duration, and/or a publication date. Some of the attributes, such as the title and description, can be stored in the podcast episode and/or video content item metadata. Hence, the attribute extraction module 203 can read the metadata and extract the relevant attributes. The attribute extraction module 203 can store the extracted attributes in the data store 110. Other attributes may not be stored in the metadata of the associated media item, in which case attribute extraction module 203 can use other techniques to identify and extract the relevant attribute. For instance, the attribute extraction module 203 can generate a transcript of the media item using various transcription techniques. In some implementations, the podcast episodes 211 can be a table that stores podcast episode identifiers along with associated podcast episode attributes, and video content items 212 can be a table that stores video content item identifiers along with associated video content item attributes.

Comparison score generator 205 can generate a comparison score for each media item (i.e., for each podcast episode referenced in podcast episodes 211 and/or for each video content item referenced in video content items 212). In some implementations, the comparison score generator 205 can identify a first podcast episode identifier in podcast episodes 211. The first podcast episode identifier can be one that does not have a matching video content item. That is, the first podcast episode identifier can be one that is not included in the matched episodes 215 of data store 110.

The comparison score generator 205 can compare the extracted attributes of the first podcast episode identifier with the extracted attributes of the video content items 212. Based on the comparison of the attributes, the comparison score generator 205 can generate a matching score. If the matching score exceeds a threshold score, the first podcast episode identifier and the matched video content item can be added to the matching score heap 213. The matching score heap 213 can store a list of episode identifiers, video content item identifiers, and their matching score. The matching score heap 213 can be ordered by the matching score values, with the highest matching score value at the head of the heap.

In some implementations, the comparison score generator 205 can first compare the transcript attribute of the first podcast episode identifier to the transcript attribute of video content items 212. In some implementations, the transcript can be the best way to match a video content item to a podcast episode. If the matching score based on the transcript satisfies the matching criterion (i.e., exceeds the matching score threshold), the comparison score generator 205 can stop there. In some implementations, the matching score generator 205 can compare the rest of the attributes to generate a more comprehensive matching score.

In some implementations, the matching module 207 can determine a match value of each attribute. The matching score can then be a weighted average of the attributes' match value. For example, the matching module 207 can compare the transcript associated with a podcast episode identifier to the transcript associated with a video content item identifier. If the transcripts match or substantially match (e.g., more than a certain percentage of the transcripts match, e.g. 70%), the matching module 207 can store a match value for the transcript attribute. In some implementations, the match value for each attribute can be "1" for a match, and "0" for no match. Similarly, the matching module 207 can compare the title attribute associated with the podcast episode identifier to the title associated with the video content item identifier. If the titles match or substantially match (e.g., more than a percentage of the titles match, e.g., 90%), the matching module 207 can store a match value (e.g., "1") for the title attribute. If the titles do not match, the matching module 207 can store a no-match value (e.g., "0") for the title attribute. The matching module 207 can perform a similar comparison for each attribute associated with the podcast episode identifier and with the video content item identifier.

To determine a matching score, in some implementations, the matching module 207 can aggregate the attribute match values. If the matching score is over a certain threshold, the matching module 207 can determine that the podcast episode identifier and the video content item identifier match. In some implementations, the matching module 207 can determine a matching score using an average, or a weighted average, of the attribute match values. For example, the matching module 207 can give a higher weight to the transcript, since a match in a transcript indicates a high likelihood that the podcast episode identifier and the video content item identifier match. As another example, the matching module 207 can give a lower weight to the publication date, since podcast episodes and video content items of the podcast episode can be published on different dates. The matching module 207 can use other techniques to determine the matching score for each podcast episode identifier and video content item identifier pair.

The matching module 207 can determine when the matching score heap 213 is not empty. When the matching score heap 213 is not empty, the matching module 207 can select the first entry in the matching score heap 213 (i.e., the matched podcast episode identifier and video content item identifier with the highest matching score). In some implementations, the matching module 207 can determine whether the podcast episode identifier and/or the video content item identifier in the first entry of the matching score heap 213 have already been matched by checking to see if the either podcast episode identifier and/or the video content item identifier are listed in the matched episodes 215 list or the matched videos list 217, respectively. If they have not been matched, the matching module 207 can add the podcast episode identifier and the video content item identifier in the first entry of the matching score heap 213 to the matched episodes 215 list or the matched videos list 217, respectively.

FIGS. 3-10 illustrate example graphical user interfaces (GUIs) on a client device, in accordance with implementations of the present disclosure. FIGS. 3-7 illustrate example GUIs on a user device illustrating content provided by a content sharing platform, such as content sharing platform 120 of FIG. 1. FIG. 8 illustrates an example GUI on a user device illustrating search results as provided by a search platform, such as search engine platform 130 of FIG. 1. FIGS. 9-10 illustrate example GUIs on a user device illustrating content provided by a podcast manager platform, such as podcast manager platform 150 of FIG. 1.

Figure 3:
FIG. 3 illustrates an example graphical user interface (GUI) on a client device, illustrating an example podcast destination page on a content sharing platform, in accordance with an implementation of the disclosure.

FIG. 3 illustrates an example podcast destination page 300 on a content sharing platform on a user device, in accordance with an implementation of the disclosure. In some implementations, platform optimizer 170A of FIG. 1 can enhance the content sharing platform 120 by providing a podcast destination page, as illustrated in FIG. 3. The podcast destination page can include podcasts that a user has expressed interest in (e.g., a podcast that a user usually listens to or has listened to, or a podcast that a user has subscribed to or liked). The podcast destination page can include podcasts that are related to topics a user has expressed interest in. In some implementations, the podcast destination page can include links to podcasts and/or podcast episodes that have rankings enhanced by the platform optimizer 170A. For example, Podcast 302 illustrated in FIG. 3, can have a matched video content item. The combined popularity indicators associated with Podcast 302 and its matched video content item can cause Podcast 302 to be listed in a user's podcast destination page. The podcast destination page can group the podcasts based on topics and/or style, e.g., "inspirational talks" and "talk shows," as illustrated in FIG. 3.

Figure 4:
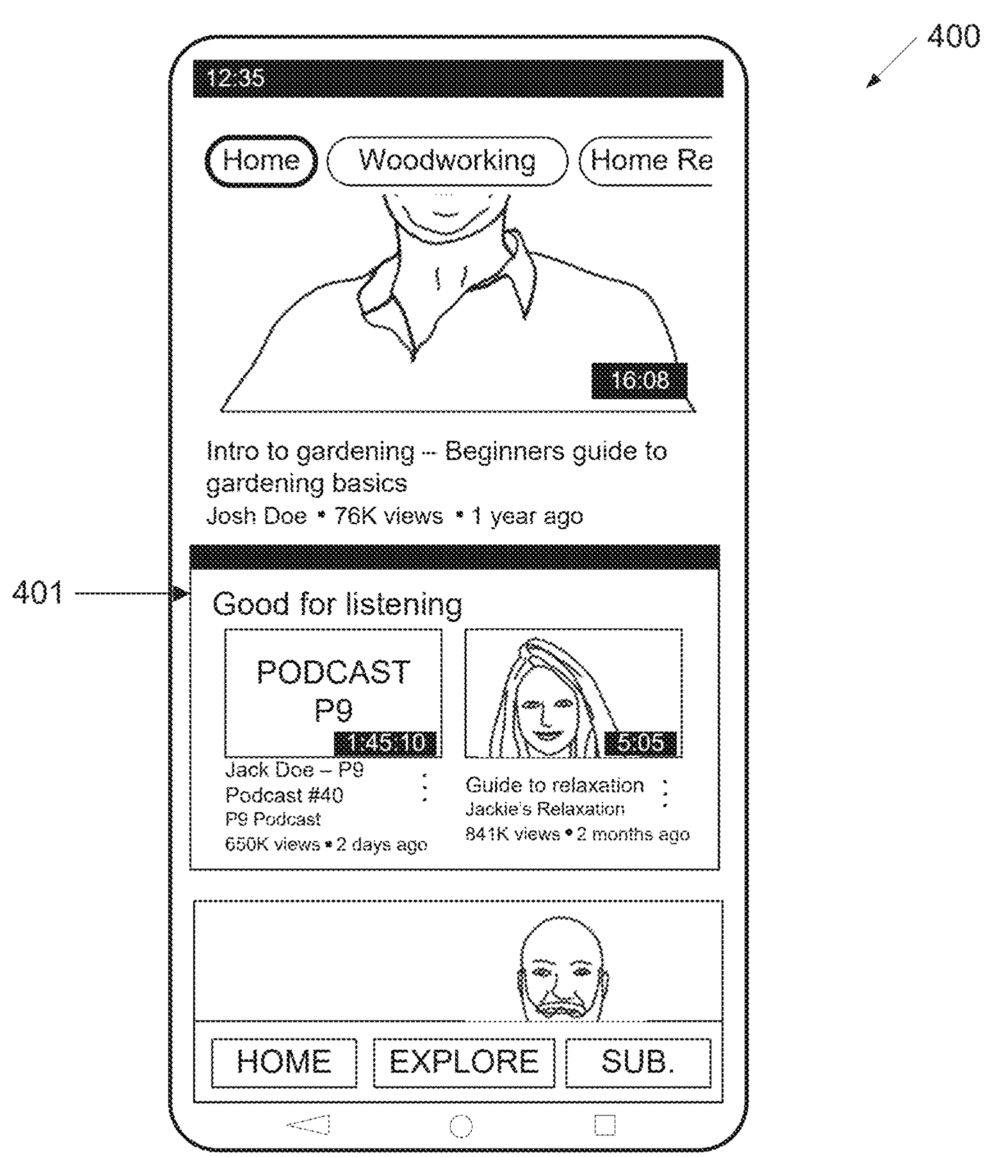
FIG. 4 illustrates an example GUI on a client device, illustrating an example of a content sharing platform that includes both podcast episodes and video content items, in accordance with an implementation of the disclosure.

FIG. 4 illustrates an example GUI 400 of a content sharing platform that includes both podcast episodes and video content items, in accordance with an implementation of the disclosure. Included in the home screen illustrated in FIG. 4 is a "Good for listening" section 401. In some implementations, the platform optimizer 170A of FIG. 1 can enhance the content sharing platform 120 to include links to video content items that have been matched to a podcast episode. The video content items listed in the "Good for listening" section 401 can be ranked according to the combined popularity indicators of the matched video content item and the matched podcast episode.

Figure 5:
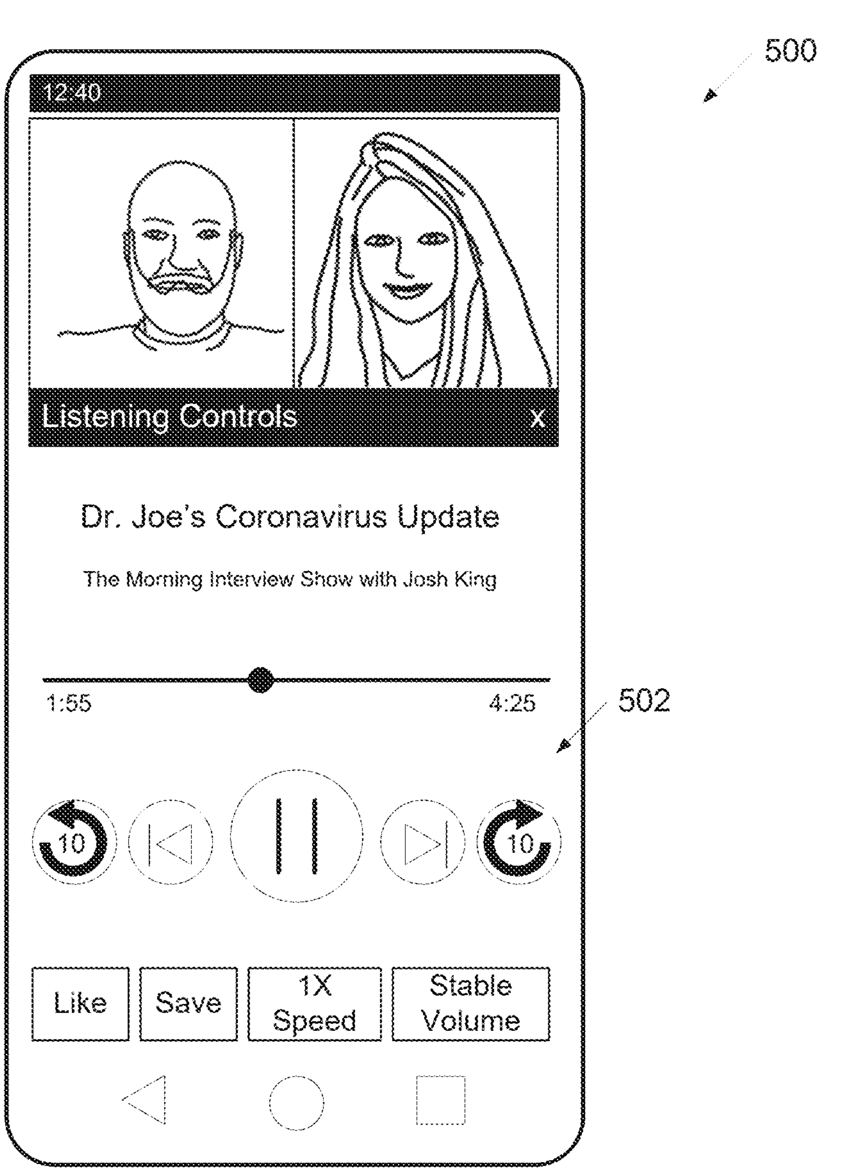
FIG. 5 illustrates an example GUI of a content sharing platform optimized for audio content, in accordance with an implementation of the disclosure.

FIG. 5 illustrates an example GUI 500 of a content sharing platform optimized for audio content, such as a video content item matched to a podcast episode, in accordance with an implementation of the disclosure. In one example, a user can select a podcast episode from the "Good for Listening" section 401 illustrated in FIG. 4, and the podcast episode can be presented to the user as illustrated in FIG. 5. The GUI 500 can include information provided by both the matched podcast episode identifier and the matched video content item. For example, the GUI 500 can include the video content item in the top portion of the screen, and the bottom portion of the screen can include information extracted from the matched podcast episode. For example, the host information can be extracted from the matched podcast episode metadata. Video content items that have been matched to a podcast episode can be provided to the user via the content sharing platform using the GUI 500 optimized for listening, in which, rather than showing the video content item on a full screen, the video content item can take up less than half the screen, and the listening controls 502 can be more prominent on the screen.

Figure 6:
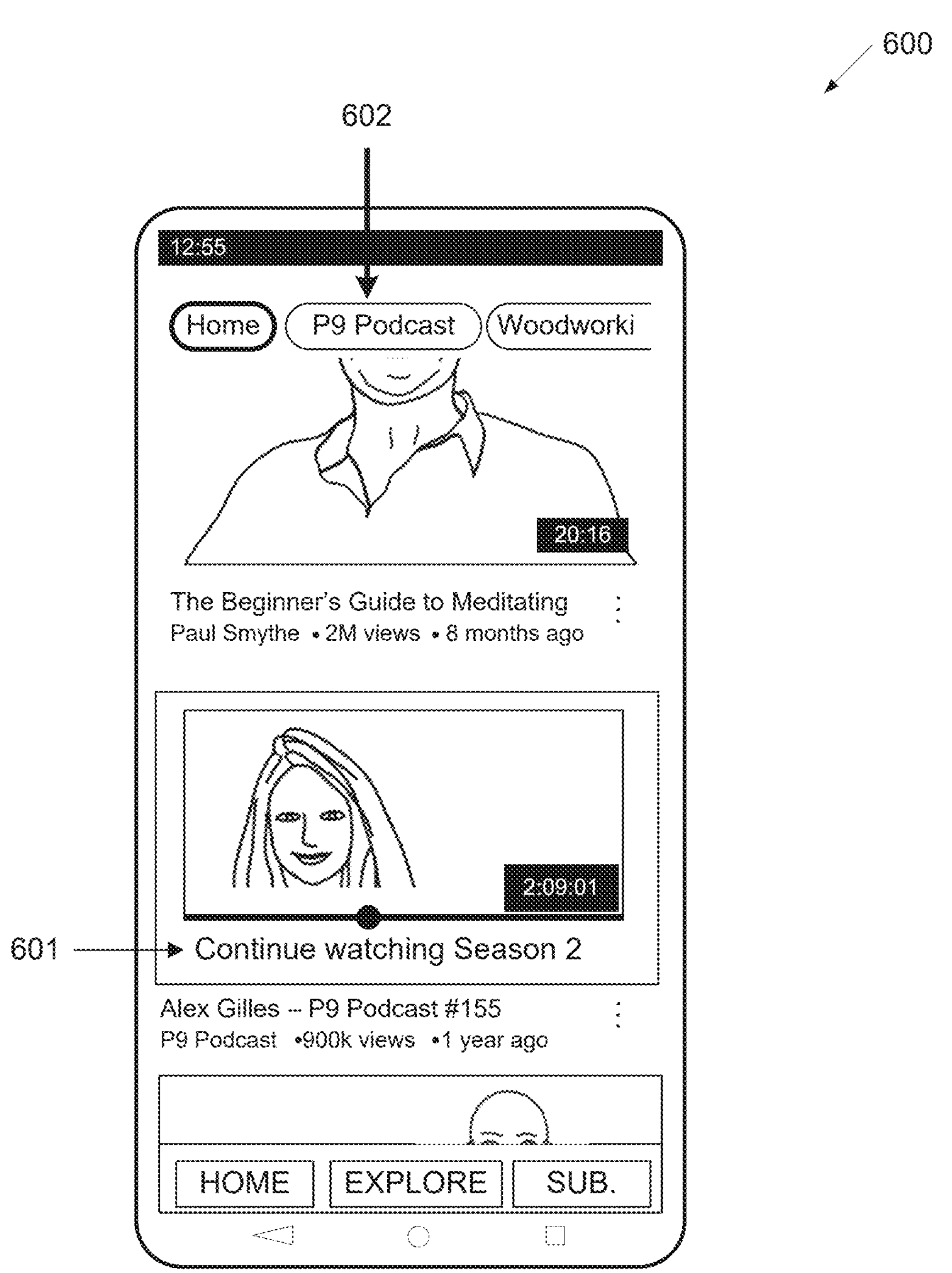
FIG. 6 illustrates an example GUI of a content sharing platform enhanced for episodic content, in accordance with an implementation of the disclosure.

FIG. 6 illustrates an example GUI 600 of a content sharing platform enhanced for episodic content in accordance with an implementation of the disclosure. As illustrated in FIG. 6, the GUI 600 includes a link to a podcast 602, as well as a video of a podcast episode displayed in the main portion of the screen. By matching the video of the podcast episode to a podcast series associated with the podcast episode, the GUI 600 can display additional information associated with the matched podcast. In the example illustrated in FIG. 6, a link 601 to "Continue watching Season 2" of the podcast series can be added to the GUI 600. Without matching the video of the podcast episode to the podcast episode identifier (and hence to the podcast series), the content sharing platform may not have enough information to include, in GUI 600, a link to the other podcast episodes in the series.

Figure 7:
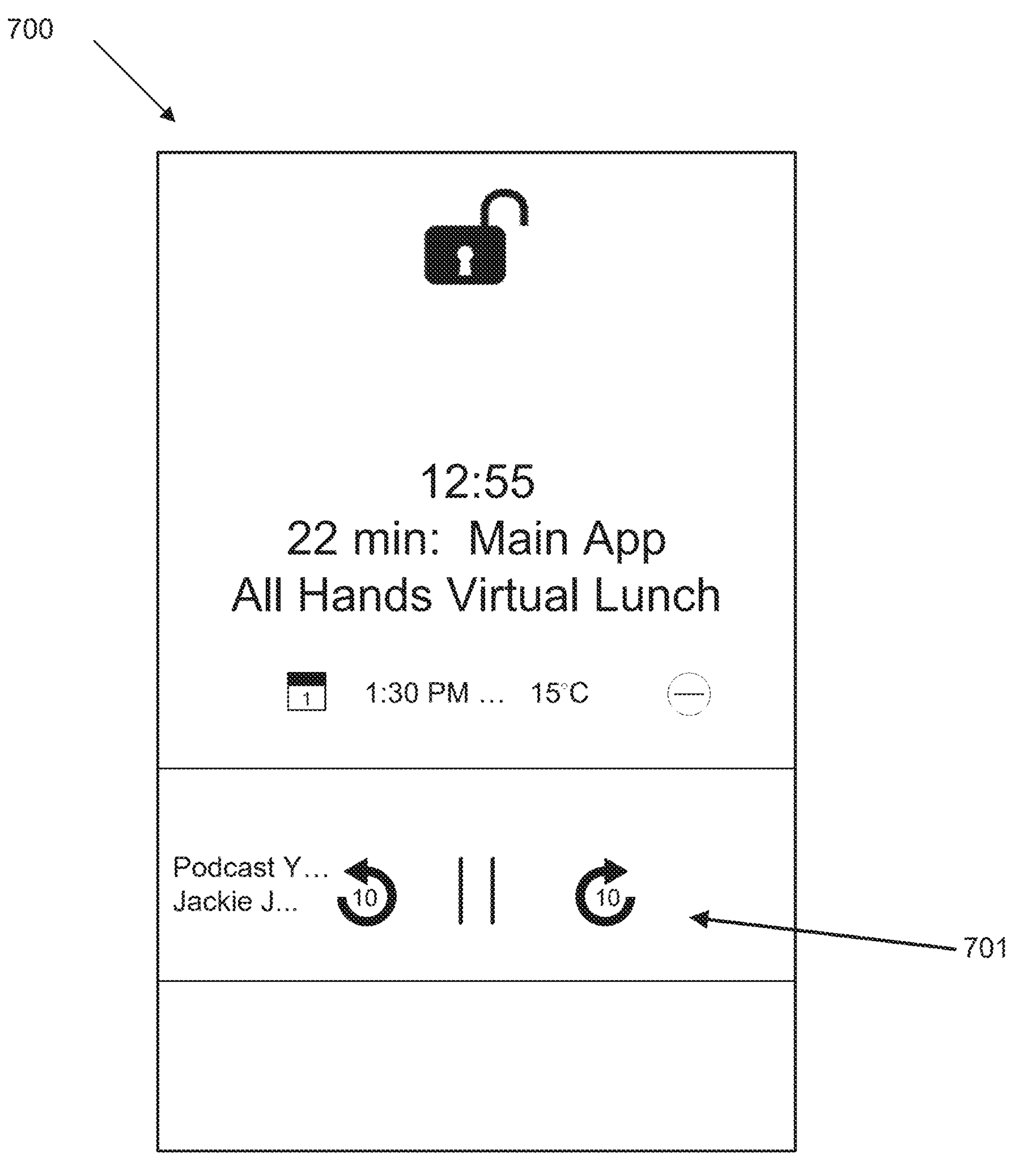
FIG. 7 illustrates an example GUI of a lock screen of a user device showing media controls optimized for listening to audio content, in accordance with an implementation of the disclosure.

FIG. 7 illustrates an example GUI 700 of a lock screen showing media controls optimized for listening to audio content such as a podcast episode, in accordance with an implementation of the disclosure. The lock screen can be displayed on a mobile device while the mobile device is playing a video matched to a podcast episode using a content sharing platform. Because the video is matched to a podcast episode, the GUI 700 can display an optimized lock screen that shows media controls better suited for audio content. That is, rather than providing media controls traditionally used for watching video content items (e.g., "skip" controls), the GUI 700 can provide media controls traditionally used for audio content, such as +/−10 second seek controls 701.

FIG. 8 illustrates an example GUI 800 of a search engine platform optimized according to aspects of the present disclosure. In this example, the results of the search engine combine audio episode search results with video content search results. As shown in FIG. 8, the search results may be presented in a carousel showing mixed contents, such as some audio content items (e.g., podcasts or podcast episode), and some video content items. More specifically, the search results include a carousel 803 that includes a link to a podcast episode 801 as well as a link to video content item 802. Conventional search engine platforms may display two carousels, one for podcasts and one for videos, occupying more space on the screen which may be especially problematic for mobile device screens that are smaller in size.

FIG. 9 illustrates an example GUI 900 of a podcast manager platform optimized according to aspects of the present disclosure. As illustrated by header 902, the analytical information provided to a user (e.g., a podcast publisher) via the podcast manager platform (e.g., podcast manager platform 150 of FIG. 1) includes analytical information from both a podcast publisher and a content sharing platform. In an example, a platform optimizer (e.g., platform optimizer 170C of FIG. 1) identified video content items to match the podcast episodes listed in FIG. 9, and has combined the analytical information associated with both the podcast episodes and the matched video content items. When a mouse hovers over a metric, further details can be shown. For example, as illustrated in FIG. 9, the mouse is hovering over the number of plays for Ep114. Box 904 displays the breakdown of the number of plays for Ep114, which includes 48 plays on the podcast publisher platform and 128 plays on a content sharing platform.

FIG. 10 illustrates an example GUI 1000 providing additional detail regarding the analytical information provided to a user, in accordance with aspects of the present disclosure. For example, GUI 1000 includes additional detail regarding the number of plays for Ep144 from FIG. 9. The total number of plays for the podcast episode and the matching video content item is 176, with 48 plays being audio plays, and 128 plays being video plays. The minutes played is an aggregate of the total number of minutes played of both the video content item and the podcast episode. The graph illustrates the aggregate number of plays on a timeline.

Figure 11:
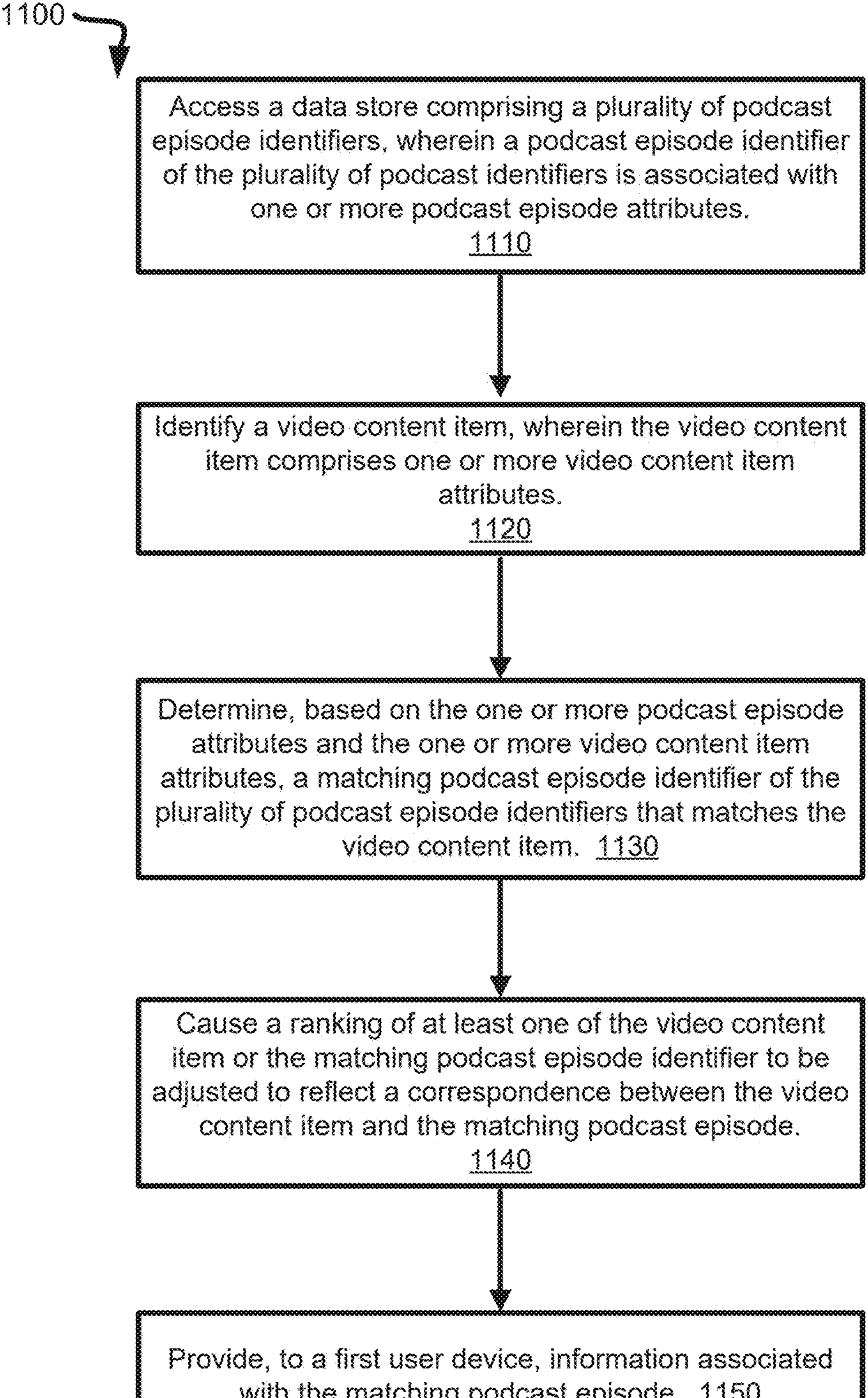
FIG. 11 depicts a flow diagram of a method for enhancing a content sharing platform by matching video content items to podcast episodes, in accordance with an implementation of the disclosure.
Figure 13:
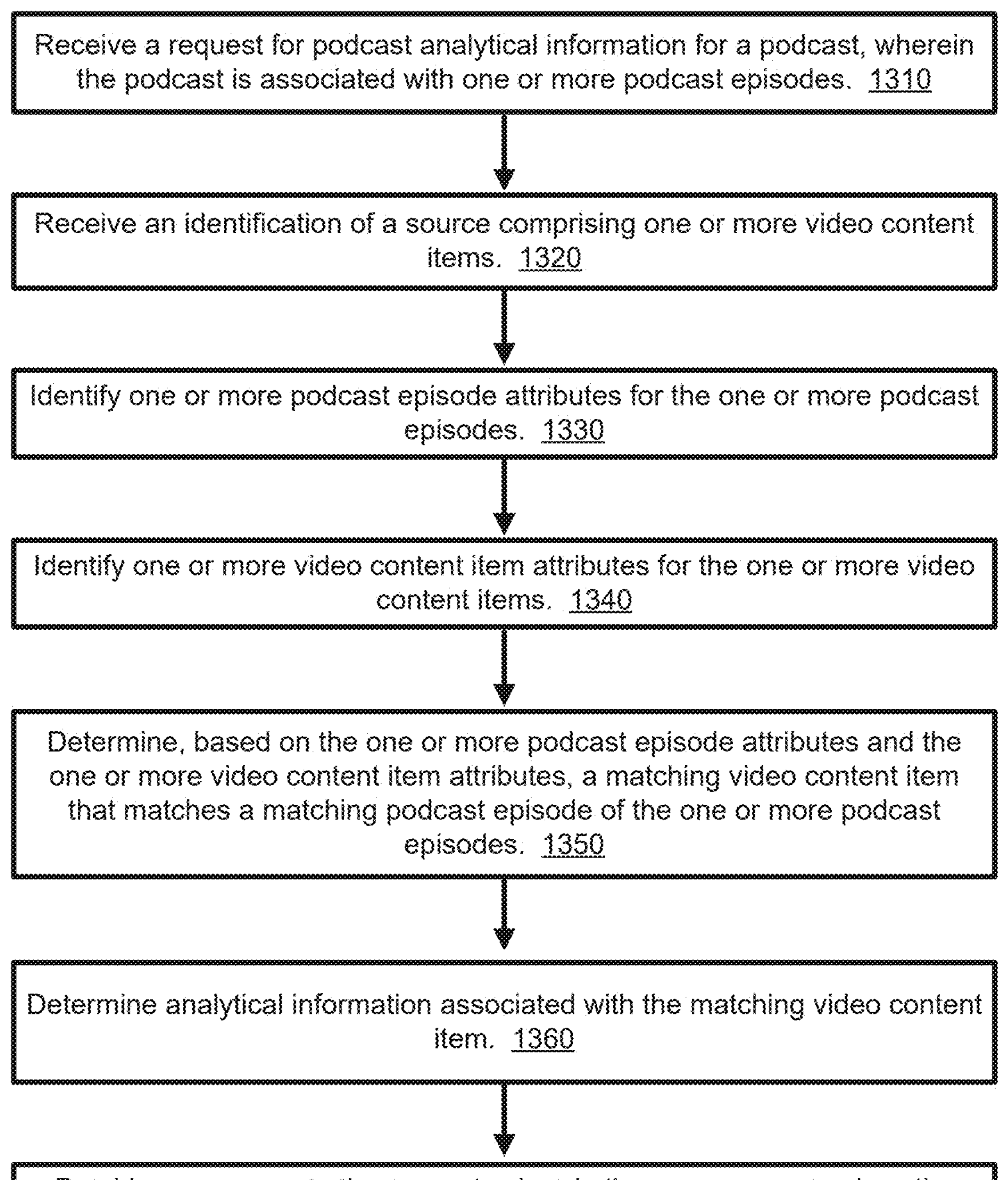
FIG. 13 depicts a flow diagram of a method for enhancing a podcast manager platform by matching video content items to podcast episodes, in accordance with an implementation of the disclosure.

FIGS. 11, 12, and 13 depict flow diagrams of methods 1100, 1200, and 1300 performed in accordance with some implementations of the disclosure. The methods 1100, 1200, and 1300 can be performed by processing logic that can include hardware (circuitry, dedicated logic, etc.), software (e.g., instructions run on a processing device), or a combination thereof. In one implementation, some or all the operations of methods 1100, 1200, and 1300 can be performed by one or more components of system 100 of FIG. 1.

For simplicity of explanation, methods 1100, 1200, and 1300 of this disclosure are depicted and described as a series of acts. However, acts in accordance with this disclosure can occur in various orders and/or concurrently, and with other acts not presented and described herein. Furthermore, not all illustrated acts may be required to implement methods 400 and 500 in accordance with the disclosed subject matter. In addition, those skilled in the art will understand and appreciate that methods 1100, 1200, and 1300 could alternatively be represented as a series of interrelated states via a state diagram or events. Additionally, it should be appreciated that methods 1100, 1200, and 1300 disclosed in this specification are capable of being stored on an article of manufacture to facilitate transporting and transferring such methods to computing devices. The term "article of manufacture," as used herein, is intended to encompass a computer program accessible from any computer-readable device or storage media.

FIG. 11 is a flow diagram of method 1100 for enhancing a content sharing platform by matching video content items to podcast episodes, in accordance with some implementations of the disclosure. At block 1110, processing logic can access a data store that stores a plurality of podcast episode identifiers. A podcast episode identifier of the plurality of podcast identifiers can be associated with one or more podcast episode attributes.

The podcast episode attributes and/or the video content item attributes can include at least one of the following: a transcript of the audio, the audio content, a title, a description, a duration, or a publication date. The processing logic can identify the attributes by reading the metadata associated with the respective podcast episode identifier and/or video content item identifier. For example, the publication date of the podcast episode can be stored in metadata associated with the podcast episode identifier. In some implementations, the processing logic can determine or generate the attributes. For example, the processing logic can use transcription techniques to generate a transcript of the podcast episode associated with the podcast episode identifier. The attributes can be similarly obtained from the video content item and/or from the video content item metadata associated with the video content item identifier.

At block 1120, processing logic can identify a video content item. The video content item can include, or be associated with, one or more video content item attributes. In some implementations, the processing logic can receive an identification of the video content item from a user device. For example, a user using the content sharing platform can upload a video content item to the content sharing platform. The processing logic can identify the video as a video content item, and can extract or identify the one or more video content item attributes. In some implementations, processing logic can identify video content items already uploaded to the content sharing platform.

At block 1130, processing logic may determine, based on the one or more podcast episode attributes and the one or more video content item attributes, a matching podcast episode of the plurality of podcast episode identifiers that matches the video content item.

In some implementations, in order to determine the matching podcast episode, the processing logic may compare the one or more video content item attributes to the one or more podcast episode attributes of each the plurality of podcast episode identifiers. In some implementations, the processing logic can, for each podcast episode identifier, compare the podcast episode attributes to the video content item attributes. For example, the processing logic can compare the transcript associated with each podcast episode identifier to the transcript associated with the video content item identifier. The processing logic can assign a match value for each compared attribute. For example, if the transcripts match, the processing logic can assign a match value of “1” for the transcript attribute; if the titles do not match, the processing logic can assign a match value of “0” for the title attribute. The determination of whether attributes match can include a substantial match. That is, the processing logic can determine that the transcripts match if a certain percentage (e.g., 70%) of the transcripts match; or the processing logic can determine that the descriptions match if a percentage (e.g., 90%) of the descriptions match.

The processing logic can determine, for each of the one or more podcast episode identifiers, a matching score based on the comparison. In some implementations, the matching score can be an aggregate of the match value of each compared attribute. In some implementations, the matching score can be an average (or a weighted average) of the match values of each compared attribute. For example, the processing logic can assign a higher weight to the transcript, and a lower weight to the title. The processing logic can identify the matching podcast episode identifier that has the highest matching score that satisfies a matching criterion. The highest matching score can satisfy the matching criterion by exceeding a minimum matching score threshold value.

In some implementations, in order to determine the matching podcast episode, the processing logic may provide the one or more video content item attributes as input to a machine learning model. The machine learning model may be trained to identify the matching podcast episode based on the one or more podcast episode attributes and the video content item attributes.

At block 1140, processing logic can cause a ranking of at least one of the video content item or the matching podcast episode to be adjusted to reflect a correspondence between the video content item and the matching podcast episode. In some implementations, the ranking of the video content item or the ranking of the matching podcast episode is based on popularity indicators. Causing the ranking of the video content item or the matching podcast episode to be adjusted to reflect the correspondence between the video content item and the matching podcast episode can include combining the popularity indicators associated with the video content item with the popularity indicators associated with the matching podcast episode.

At block 1150, processing logic can provide, to a first user device, information associated with the matching podcast episode. In some implementations, the information associated with the matching podcast episode is provided in response to receiving a search query from a user device. The result of the search query can include the video content item. Furthermore, the result of the search query can include podcast analytical information associated with the matching podcast episode. In some implementations, the information associated with the matching podcast episode includes host information, previous/next podcast episode controls, and/or a listen-only option.

FIG. 12 depicts a flow diagram of method 1200 for enhancing a search engine platform by matching video content items to podcast episodes, in accordance with some implementations of the present disclosure.

At block 1210, processing logic can access a data store comprising one or more podcast episode identifiers and one or more video content item identifiers. A podcast episode identifier of the one or more podcast episode identifiers can be associated with one or more podcast episode attributes. A video content item identifier of the one or more video content item identifiers can be associated with one or more video content item attributes.

The podcast episode attributes and/or the video content item attributes can include at least one of the following: a transcript of the audio, the audio content, a title, a description, a duration, or a publication date. The processing logic can identify the attributes by reading the metadata associated with the respective podcast episode identifier and/or video content item identifier. For example, the publication date of the podcast episode can be stored in metadata associated with the podcast episode identifier. In some implementations, the processing logic can determine or generate the attributes. For example, the processing logic can use transcription techniques to generate a transcript of the podcast episode associated with the podcast episode identifier. The attributes can be similarly obtained from the video content item and/or from the video content item metadata associated with the video content item identifier.

The processing logic can also periodically identify additional podcast episodes and/or additional video content items and store the associated additional podcast episode identifiers and/or additional video content item identifiers in the data store. In some implementations, the processing logic can crawl the Internet to identify additional podcast episodes and video content items. In some implementations, the processing logic can receive additional podcast episodes and/or video content items. For example, a user can upload a podcast episode and/or a video content item to a platform, and the processing logic can store the newly uploaded podcast episode identifier and/or video content item identifier in the data store.

At block 1220, processing logic can determine, for a matching podcast episode identifier of the one or more podcast episode identifiers, a matching video content item identifier based on the one or more podcast episode attributes associated with a matching podcast episode identifier. In some implementations, the processing logic can select one of the plurality of the podcast episode identifiers from the data store as the matching podcast episode identifier for which to find a matching video content item. In some implementations, the data store includes an identifier indicating whether each podcast episode identifier in the data store has a matching video content item identifier. The processing logic can select the matching podcast episode identifier as the first podcast episode identifier in the data store that does not have a matching video content item. In some implementations, the processing logic can select the matching podcast episode identifier based on popularity indicators. That is, the processing logic can identify a podcast episode identifier that does not have a matching video content item but that has high popularity indicators (such as a number of plays or a number of likes over respective threshold values) as the matching podcast episode identifier.

In some implementations, in order to determine a matching video content item identifier, the processing logic may compare the one or more podcast episode attributes associated with the matching podcast episode identifier to the one or more video content item attributes associated with the one or more video content item identifiers. In some implementations, the processing logic can, for each video content item identifier, compare the podcast episode attributes associated with the matching podcast episode identifier to the video content item attributes. For example, the processing logic can compare the transcript associated with the matching podcast episode identifier to the transcript associated with each video content item identifier. The processing logic can assign a match value for each compared attribute. For example, if the transcripts match, the processing logic can assign a match value of "1" for the transcript attribute; if the titles do not match, the processing logic can assign a match value of "0" for the title attribute. The determination of whether attributes match can include a substantial match. That is, the processing logic can determine that the transcripts match if a certain percentage (e.g., 70%) of the transcripts match; or the processing logic can determine that the descriptions match if a percentage (e.g., 90%) of the descriptions match.

The processing logic can determine, for each of the one or more video content item identifiers, a matching score based on the comparison. In some implementations, the matching score can be an aggregate of the match value of each compared attribute. In some implementations, the matching score can be an average (or a weighted average) of the match values of each compared attribute. For example, the processing logic can assign a higher weight to the transcript, and a lower weight to the title. The processing logic can identify the matching video content item identifier that has the highest matching score that satisfies a matching criterion. The highest matching score can satisfy the matching criterion by exceeding a minimum matching score threshold value.

In some implementations, in order to determine the matching video content item identifier, the processing logic can provide the one or more video content item attributes as input to a machine learning model. The machine learning model can be trained to identify the matching video content item identifier based on the one or more matching podcast episode attributes and the video content item attributes.

At block 1230, processing logic can cause a ranking of at least one of the matching video content item identifier or the matching podcast episode identifier to be adjusted to reflect a correspondence between the matching video content item identifier and the matching podcast episode identifier. In some implementations, the ranking of the matching video content item or the ranking of the matching podcast episode is based on popularity indicators. Causing the ranking of the video content item or the matching podcast episode to be adjusted to reflect the correspondence between the video content item and the matching podcast episode can include combining the popularity indicators associated with the matching video content item identifier with the popularity indicators associated with the matching podcast episode identifier.

At block 1240, processing logic can provide, to a user device, information associated with the matching podcast episode identifier and with the video content item identifier. In some implementations, the information associated with the matching podcast episode identifier and with the matching video content item identifier can be provided in response to receiving a search query from a user device. The result of the search query can include at least one of the matching video content item or the matching podcast episode identifier. For example, a search result that includes a particular video content item, provided to a user through a platform that is not enhanced with aspects of the present disclosure, would include only the video content item and the information associated with the video content item. However, by matching the video content item to a podcast episode according to aspects of the present disclosure, the search platform can enhance the search results by providing both the video content item and the matched podcast episode, along with associated information, to the user device. Hence, information that may have only been associated with the podcast episode (e.g., host information), is added to the search result.

FIG. 13 depicts a flow diagram of method 1300 for enhancing a podcast manager platform by matching video content items to podcast episodes, in accordance with an implementation of the disclosure. At block 1310, processing logic can receive a request for podcast analytical information for a podcast, wherein the podcast is associated with one or more podcast episodes. In some implementations, the processing logic may receive a request from a user device implementing a podcast manager platform. A user can request podcast analytical information associated with a particular podcast.

At block 1320, processing logic can receive an identification of a source comprising one or more video content items. In some implementations, the podcast can be associated with a particular channel or channels on a content sharing platform. In other implementations, a user may provide to the podcast manager platform a source containing one or more video content items associated with the podcast.

At block 1330, processing logic may identify one or more podcast episode attributes for the one or more podcast episodes. At block 1340, processing logic may identify one or more video content item attributes for the one or more video content items. The podcast episode attributes and/or the video content item attributes can include at least one of the following: a transcript of the audio, the audio content, a title, a description, a duration, or a publication date. The processing logic can identify the attributes by reading the metadata associated with the respective podcast episode identifier and/or video content item identifier. For example, the publication date of the podcast episode can be stored in metadata associated with the podcast episode identifier. In some implementations, the processing logic can determine or generate the attributes. For example, the processing logic can use transcription techniques to generate a transcript of the podcast episode associated with the podcast episode identifier. The attributes can be similarly obtained from the video content item and/or from the video content item metadata associated with the video content item identifier. In some implementations, the processing logic can receive the attributes from the user device (e.g., a user can provide the attributes).

At block 1350, processing logic can determine, based on the one or more podcast episode attributes and the one or more video content item attributes, a matching video content item that matches a matching podcast episode of the one or more podcast episodes. In some implementations, the processing can first identify a matching podcast episode from the one or more podcast episodes for which to identify a matching video content item. The processing logic can identify a podcast episode as the matching podcast episode for which to identify a matching video content item based on popularity indicators (i.e., identifying a matching video content item for the most popular podcast episode), or methodically (i.e., selecting the first podcast episode in a list of podcast episodes). The podcast episode selected as the matching podcast episode can be one that does not already have a matched video content item. The processing logic can determine a matching video content item for each podcast episode associated with the identified podcast.

In order to determine the matching video content item, the processing logic can determine a matching score for the one or more video content items by comparing the respective video content item attributes to the one or more podcast episode attributes associated with the matching podcast episode. The matching score can be determined as described above with respect to FIGS. 11 and 12, by comparing the attributes of the matching podcast episode to the attributes of each video content item. The processing logic can identify the matching video content item as the video content item that has the highest matching score. In some implementations, the matching score satisfies a matching criterion by exceeding a threshold matching value. For example, if the highest matching video content item has a matching score below the threshold matching value, the processing logic may not identify it as a match.

In some implementations, in order to determine the matching video content item identifier, the processing logic can provide the one or more video content item attributes and the matching podcast episode attributes as input to a machine learning model. The machine learning model can be trained to identify the matching video content item identifier based on the one or more matching podcast episode attributes and the video content item attributes.

At block 1360, processing logic can determine analytical information associated with the matching video content item. At block 1370, processing logic may provide a response to the request, wherein the response comprises the analytical information associated with the matching video content item and the podcast analytical information. In some implementations, the analytical information provided in response to the request can include a combined number of plays associated with each podcast episode and the matching video content item, as illustrated in example GUIs in FIGS. 9 and 10. The analytical information provided in response to the request can also include additional combined information, such as a combined average length of plays, or a combined number of plays in the first 30 days, for example. Analytical information can also include demographics about the podcast listeners and video content item viewers.

Figure 14:
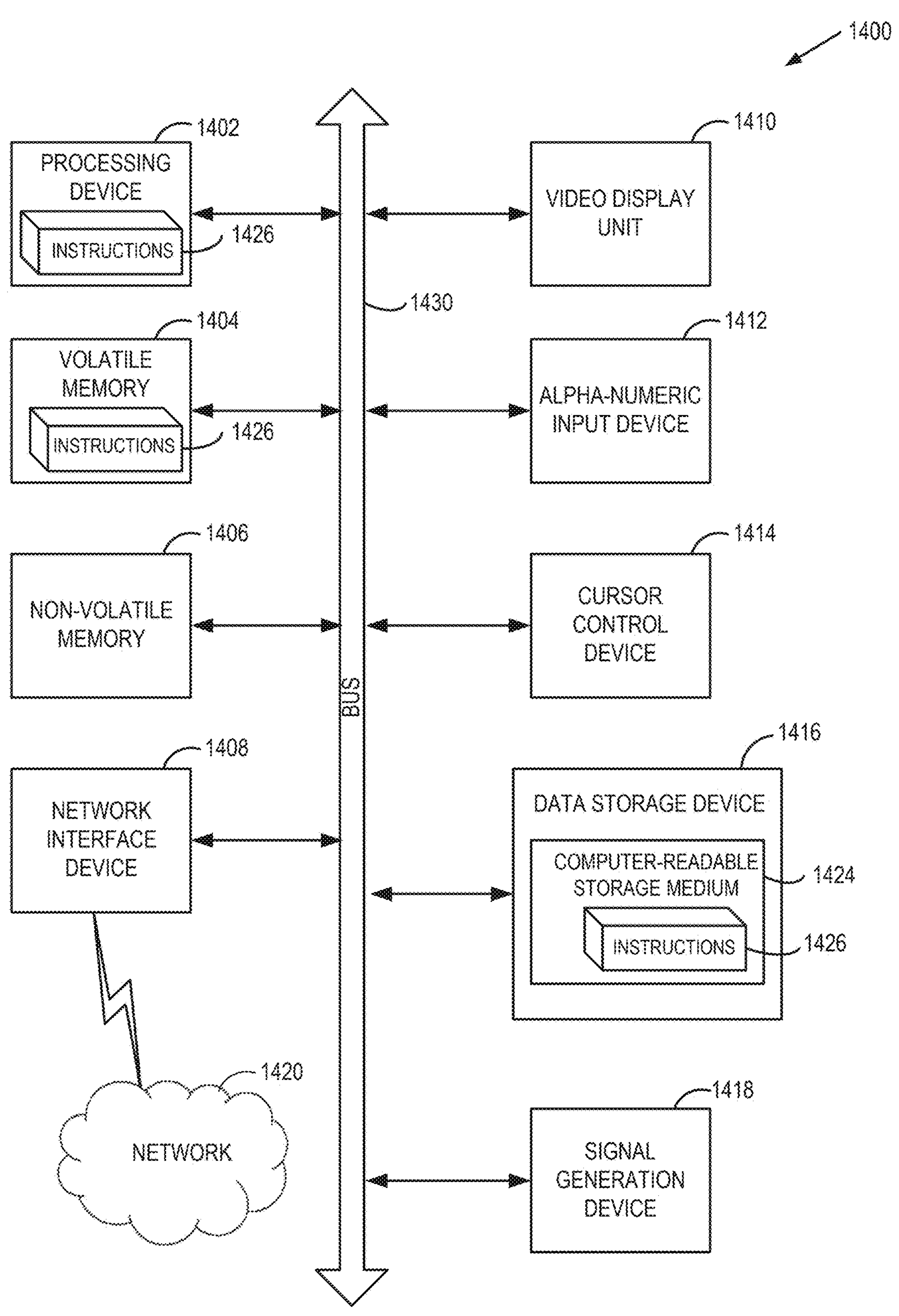
FIG. 14 depicts a block diagram of a computer system operating in accordance with an implementation of the disclosure.

FIG. 14 is a block diagram illustrating an exemplary computer system 1400, in accordance with implementations of the present disclosure. The computer system 1400 can correspond to server machine 140 content sharing platform 120 and/or end user devices 102A-N, described with respect to FIG. 1. Computer system 1400 can operate in the capacity of a server or an endpoint machine in an endpoint-server network environment, or as a peer machine in a peer-to-peer (or distributed) network environment. The machine can be a television, a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1400 includes a processing device (processor) 1402, a main memory 1404 (e.g., read-only memory (ROM), flash memory, dynamic random access memory (DRAM) such as synchronous DRAM (SDRAM), double data rate (DDR SDRAM), or DRAM (RDRAM), etc.), a static memory 1406 (e.g., flash memory, static random access memory (SRAM), etc.), and a data storage device 1418, which communicate with each other via a bus 1440.

Processor (processing device) 1402 represents one or more general-purpose processing devices such as a microprocessor, central processing unit, or the like. More particularly, the processor 1402 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 1402 can also be one or more special-purpose processing devices such as an application specific integrated circuit (ASIC), a field programmable gate array (FPGA), a digital signal processor (DSP), network processor, or the like. The processor 1402 is configured to execute instructions 1426 (e.g., for identifying matching video content items and podcast episodes) for performing the operations discussed herein.

The computer system 1400 can further include a network interface device 1408. The computer system 1400 also can include a video display unit 1410 (e.g., a liquid crystal display (LCD) or a cathode ray tube (CRT)), an input device 1412 (e.g., a keyboard, and alphanumeric keyboard, a motion sensing input device, touch screen), a cursor control device 1414 (e.g., a mouse), and a signal generation device 1420 (e.g., a speaker).

The data storage device 1418 can include a non-transitory machine-readable storage medium 1424 (also computer-readable storage medium) on which is stored one or more sets of instructions 1426 (e.g., for optimizing platform(s) using identified matched pairs of video content items and podcast episodes) embodying any one or more of the methodologies or functions described herein. The instructions can also reside, completely or at least partially, within the main memory 1404 and/or within the processor 1402 during execution thereof by the computer system 1400, the main memory 1404 and the processor 1402 also constituting machine-readable storage media. The instructions can further be transmitted or received over a network 1430 via the network interface device 1408.

In one implementation, the instructions 1426 include instructions for identifying matching pairs of podcast episode identifiers and video content item identifiers, and for optimizing platforms based on the identified matched pairs. While the computer-readable storage medium 1424 (machine-readable storage medium) is shown in an exemplary implementation to be a single medium, the terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing, encoding or carrying a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, optical media, and magnetic media.

Reference throughout this specification to "one implementation," or "an implementation," means that a particular feature, structure, or characteristic described in connection with the implementation is included in at least one implementation. Thus, the appearances of the phrase "in one implementation," or "in an implementation," in various places throughout this specification can, but are not necessarily, referring to the same implementation, depending on the circumstances. Furthermore, the particular features, structures, or characteristics can be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component can be, but is not limited to being, a process running on a processor (e.g., digital signal processor), a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. Further, a "device" can come in the form of specially designed hardware; generalized hardware made specialized by the execution of software thereon that enables hardware to perform specific functions (e.g., generating interest points and/or descriptors); software on a computer readable medium; or a combination thereof.

The aforementioned systems, circuits, modules, and so on have been described with respect to interaction between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components can be combined into a single component providing aggregate functionality or divided into several separate sub-components, and any one or more middle layers, such as a management layer, can be provided to communicatively couple to such sub-components in order to provide integrated functionality. Any components described herein can also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Finally, implementations described herein include collection of data describing a user and/or activities of a user. In one implementation, such data is only collected upon the user providing consent to the collection of this data. In some implementations, a user is prompted to explicitly allow data collection. Further, the user can opt-in or opt-out of participating in such data collection activities. In one implementation, the collected data is anonymized prior to performing any analysis to obtain any statistical patterns so that the identity of the user cannot be determined from the collected data.

What is claimed is:

1. A method comprising:

receiving, from a user device, a user input comprising a search term corresponding to a first media type;

identifying, based on the search term, a first media item of the first media type, wherein the first media item is associated with a first media item characteristic;

identifying a second media item of a second media type, wherein the second media item is associated with a second media item characteristic related to the first media item characteristic, and wherein a ranking of at least one of the second media item or the first media item reflects a correspondence between the second media item and the first media item based on a popularity indicator associated with the second media item and a popularity indicator associated with the first media item; and providing, to the user device, based on the ranking, the first media item of the first media type and the second media item of the second media type.

2. The method of claim 1, further comprising:

accessing a data store comprising a first plurality of first media items of the first media type, wherein the first plurality of first media items comprises the first media item.

3. The method of claim 1, wherein the first media item characteristic comprises at least one of: a first transcript of audio, a first audio content, a first title, a first description, a first duration, or a first publication date; and wherein the second media item characteristic comprises at least one of: a second transcript of audio, a second audio content, a second title, a second description, a second duration, or a second publication date.

4. The method of claim 1, wherein the second media item is received from a second user device.

5. The method of claim 1, wherein identifying the second media item comprises:

comparing the second media item characteristic to the first media item characteristic associated with each of a first plurality of first media items of the first media type;

determining, for each of the first plurality of first media items, a matching score based on the comparing; and identifying the second media item that has a highest matching score, wherein the highest matching score satisfies a matching criterion.

6. The method of claim 1, wherein identifying the second media item comprises:

providing the first media item characteristic as input to a machine learning model trained to identify the second media item based on the second media item characteristic.

7. The method of claim 1, wherein the correspondence between the second media item and the first media item based on the popularity indicator associated with the second media item and the popularity indicator associated with the first media item reflects a combination of the popularity indicator associated with the second media item and the popularity indicator associated with the first media item.

8. A system comprising:

a memory; and a processing device communicably coupled to the memory, the processing device to:

receive, from a user device, a user input comprising a search term corresponding to a first media type;

identify, based on the search term, a first media item of the first media type, wherein the first media item is associated with a first media item characteristic;

identify a second media item of a second media type, wherein the second media item is associated with a second media item characteristic related to the first media item characteristic, and wherein a ranking of at least one of the second media item or the first media item reflects a correspondence between the second media item and the first media item based on a popularity indicator associated with the second media item and a popularity indicator associated with the first media item; and provide, to the user device, based on the ranking, the first media item of the first media type and the second media item of the second media type.

9. The system of claim 8, wherein the processing device is further to:

access a data store comprising a first plurality of first media items of the first media type, wherein the first plurality of first media items comprises the first media item.

10. The system of claim 8, wherein the first media item characteristic comprises at least one of: a first transcript of audio, a first audio content, a first title, a first description, a first duration, or a first publication date; and wherein the second media item characteristic comprises at least one of: a second transcript of audio, a second audio content, a second title, a second description, a second duration, or a second publication date.

11. The system of claim 8, wherein the second media item is received from a second user device.

12. The system of claim 8, wherein to identify the second media item, the processing device is further to:

compare the second media item characteristic to the first media item characteristic associated with each of a first plurality of first media items of the first media type;

determine, for each of the first plurality of first media items, a matching score based on the comparing; and identify the second media item that has a highest matching score, wherein the highest matching score satisfies a matching criterion.

13. The system of claim 8, wherein to identify the second media item, the processing device is further to:

provide the first media item characteristic as input to a machine learning model trained to identify the second media item based on the second media item characteristic.

14. The system of claim 8, wherein the correspondence between the second media item and the first media item based on the popularity indicator associated with the second media item and the popularity indicator associated with the first media item reflects a combination of the popularity indicator associated with the second media item and the popularity indicator associated with the first media item.

15. A non-transitory machine-readable storage medium comprising instructions that cause a processing device to perform operations comprising:

receiving, from a user device, a user input comprising a search term corresponding to a first media type;

identifying, based on the search term, a first media item of the first media type, wherein the first media item is associated with a first media item characteristic;

identifying a second media item of a second media type, wherein the second media item is associated with a second media item characteristic related to the first media item characteristic, and wherein a ranking of at least one of the second media item or the first media item reflects a correspondence between the second media item and the first media item based on a popularity indicator associated with the second media item and a popularity indicator associated with the first media item; and providing, to the user device, based on the ranking, the first media item of the first media type and the second media item of the second media type.

16. The non-transitory machine-readable storage medium of claim 15, wherein the operations further comprise:

accessing a data store comprising a first plurality of first media items of the first media type, wherein the first plurality of first media items comprises the first media item.

17. The non-transitory machine-readable storage medium of claim 15, wherein the first media item characteristic comprises at least one of: a first transcript of audio, a first audio content, a first title, a first description, a first duration, or a first publication date; and wherein the second media item characteristic comprises at least one of: a second transcript of audio, a second audio content, a second title, a second description, a second duration, or a second publication date.

18. The non-transitory machine-readable storage medium of claim 15, wherein identifying the second media item comprises:

comparing the second media item characteristic to the first media item characteristic associated with each of a first plurality of first media items of the first media type;

determining, for each of the first plurality of first media items, a matching score based on the comparing; and identifying the second media item that has a highest matching score, wherein the highest matching score satisfies a matching criterion.

19. The non-transitory machine-readable storage medium of claim 15, wherein identifying the second media item comprises:

providing the first media item characteristic as input to a machine learning model trained to identify the second media item based on the second media item characteristic.

20. The non-transitory machine-readable storage medium of claim 15, wherein the correspondence between the second media item and the first media item based on the popularity indicator associated with the second media item and the popularity indicator associated with the first media item reflects a combination of the popularity indicator associated with the second media item and the popularity indicator associated with the first media item.

* * * * *